(12) United States Patent
Safavi et al.

(10) Patent No.: US 10,425,214 B2
(45) Date of Patent: Sep. 24, 2019

(54) METHOD AND APPARATUS FOR MILLIMETER-WAVE HYBRID BEAMFORMING TO FORM SUBSECTORS

(71) Applicant: Skyriver Communications, Inc., San Diego, CA (US)

(72) Inventors: Saeid Safavi, San Diego, CA (US); Saeed Sarikhani Khorami, Carlsbad, CA (US)

(73) Assignee: Skyriver Communications, Inc., San Diego, CA (US)

( * ) Notice: Subject to any disclaimer, the term of this patent is extended or adjusted under 35 U.S.C. 154(b) by 35 days.

(21) Appl. No.: 15/730,039

(22) Filed: Oct. 11, 2017

(65) Prior Publication Data

US 2019/0109696 A1    Apr. 11, 2019

(51) Int. Cl.
| | |
|---|---|
| *H04L 5/14* | (2006.01) |
| *H04B 7/06* | (2006.01) |
| *H04W 88/08* | (2009.01) |
| *H04W 84/12* | (2009.01) |
| *H04B 7/10* | (2017.01) |

(52) U.S. Cl.
CPC ............. *H04L 5/14* (2013.01); *H04B 7/0617* (2013.01); *H04B 7/0626* (2013.01); *H04B 7/10* (2013.01); *H04W 84/12* (2013.01); *H04W 88/08* (2013.01)

(58) Field of Classification Search
None
See application file for complete search history.

(56) References Cited

U.S. PATENT DOCUMENTS

| | | | |
|---|---|---|---|
| 5,949,382 | A | 9/1999 | Quan |
| 6,317,094 | B1 | 11/2001 | Wu et al. |
| 8,466,845 | B2 | 6/2013 | ElSallal et al. |
| 9,024,834 | B1 | 5/2015 | ElSallal et al. |

(Continued)

OTHER PUBLICATIONS

Microwaves101.com, "Substrate Integrated Waveguide", https://www.microwaves101.com/encyclopedias/substrate-integrated-waveguide, Aug. 10, 2017, 8 pgs.

(Continued)

*Primary Examiner* — Chi H Pham
*Assistant Examiner* — Vladislav Y Agureyev
(74) *Attorney, Agent, or Firm* — Jaquez Land Greenhaus LLP; Bruce W. Greenhaus, Esq.

(57) ABSTRACT

Scheduling and allocating resources in a millimeter wave communication system are performed by components of both the MAC and the RF front end acting in cooperation with one another. MAC components operate essential in accordance with the 802.11 standard. Signals at 2.4/5 GHz intermediate frequency (IF) output from an IF module are upconverted to an RF mmWave spectrum. The RF signals are routed to different subsector antennas and/or polarizations of a subsector antenna in order to direct the RF mmWave signal to a desired destination. Beamforming by the physical structures of antennas, direct the RF signals to a particular subsector. The combination of allocating resources within the MAC, processing within the MBI module before being upconverting to RF, together with signal switching of the RF signals, determines the destination to which signals are to be transmitted and the source from which signals are to be received.

17 Claims, 23 Drawing Sheets

(56) References Cited

U.S. PATENT DOCUMENTS

| | | | | |
|---|---|---|---|---|
| 9,042,276 | B1* | 5/2015 | Harel | H04J 3/1694 |
| | | | | 370/277 |
| 9,337,522 | B2 | 5/2016 | Trotta et al. | |
| 9,439,096 | B2* | 9/2016 | Josiam | H04W 24/10 |
| 9,627,777 | B2 | 4/2017 | Benzel et al. | |
| 9,632,247 | B2 | 4/2017 | Fujita et al. | |
| 2014/0247820 | A1* | 9/2014 | Jeffery | H04W 16/14 |
| | | | | 370/338 |
| 2015/0180114 | A1* | 6/2015 | Achour | H01Q 1/246 |
| | | | | 455/500 |
| 2015/0207549 | A1* | 7/2015 | Nagata | H01Q 1/246 |
| | | | | 370/252 |
| 2015/0351103 | A1* | 12/2015 | Kim | H04W 16/28 |
| | | | | 455/452.1 |
| 2016/0119662 | A1* | 4/2016 | Zinevich | H04N 21/2385 |
| | | | | 725/95 |
| 2016/0353510 | A1* | 12/2016 | Zhang | H04L 43/16 |
| 2017/0019157 | A1* | 1/2017 | Mo | H04B 7/0456 |
| 2017/0033464 | A1* | 2/2017 | Henry | H01Q 13/02 |
| 2017/0215210 | A1* | 7/2017 | Lipowski | H04B 7/04 |
| 2018/0337452 | A1* | 11/2018 | Lipowski | H01Q 3/22 |
| 2018/0351619 | A1* | 12/2018 | Khan | H04B 7/0617 |

OTHER PUBLICATIONS

Aruba Networks, White Paper, 802.11AC In-Depth, 2014, 37 pgs.

Tiwari, et al., "A Substrate Integrated Waveguide Based Antipodal Linear Tapered Slot Antenna for 60 GHz Wireless Communications", ACES Express Journal, vol. 1, No. 8, Aug. 2016, pp. 220-223 (4 pgs.).

Ma, et al., "Antipodal Linearly Tapered Slot Antenna Array for Millimeter-wave Base Station in Massive MIMO Systems", IEEE, 2014, pp. 1121-1122 (2 pgs.).

Cai, et al., "Design of Compact Air-vias Perforated SIW Horn Antenna with Partially Detached Broad Walls", IEEE Transactions on Antennas and Propagation, vol. 64, Issue 6, 2016, pp. 2100-2107 (8 pgs).

* cited by examiner

METHOD AND APPARATUS FOR MILLIMETER-WAVE HYBRID BEAMFORMING TO FORM SUBSECTORS

BACKGROUND

(1) Technical Field

The disclosed methods and apparatus relate to millimeter wave communications systems and more particularly to methods and apparatus for forming high throughput millimeter wave communications using base stations having base station sectors, the sectors comprising subsectors.

(2) Background

As the use of wireless communications continues to increase, substantial progress is being made to formulate standards that govern protocols for the manner in which such communications occur. These standards are relevant to several types of communications systems, including cellular telephony, point to point communications, point to multi-point communications, short-range communications, and long-range communications using smaller cells (e.g., pico-cells and femto cells). Some of the industry standards, such as 802.11ax, contemplate using multiple input, multiple output (MIMO) technology to assist in increasing the system capacity and contemplate the possibility of providing service over longer ranges than the current 802.11 WiFi systems provide. In addition, a 5G communications standard is evolving to consider use of millimeter wavelength signals, including signals at frequencies in the range of 24-100 GHz. The use of smaller cells can increase the overall system capacity by allowing greater frequency reuse. In addition, providing base station sectors that are divided into subsectors further enhances the ability to increase capacity through even greater frequency reuse. The use of such advanced techniques and high frequencies pose significant challenges. For example, it is challenging to establish an architecture that can support higher frequencies and provide efficient, cost effective solutions that make it practical to roll out such a system on a large scale. Meeting these challenges requires substantial planning and product development.

Already contemplated by Skyriver, a leading-edge millimeter wave (mmWave) broadband provider transforming broadband, are systems that use concepts developed for use in short range 802.11n and 802.11ac compliant systems, integrated with mmWave transceivers. However, while the concepts used in 802.11 systems have advanced, additional advances in conforming products and systems are necessary to take full advantage of some of the new features provided in the newest forms of 802.11, such as 802.11ax. Therefore, there is currently a need for systems that have antenna structures that can take full advantage of all of the features that are provided by using the latest 802.11 baseband devices together with communications system that transmit and receive at microwave (i.e., mmWave) frequencies. In addition, new techniques are required for controlling the routing of signals in such communications systems to maximize the benefits of new techniques that are being introduced. Still further, there is a need to improve the manner in which channels are characterized in order to allow MIMO techniques to have the greatest positive impact and to improve the efficiency of systems that use baseband 802.11 devices together with mmWave transceivers. Taking full advantage of MIMO requires techniques that do not currently exist.

SUMMARY

The disclosed method and apparatus provides an architecture that increases the capacity, performance and efficiency of millimeter wave (mmWave) communication systems. In general, such systems have one or more base stations. Each base station is responsible for a sector communicating with several subscriber units. The following discussion relates to three different areas of the communication system.

The first area relates to the media access control (MAC) architecture within the base station and also a corresponding MAC associated with and located within each subscriber unit. In some embodiments of the disclosed method and apparatus, a time division duplex (TDD) configuration is used to schedule uplink and downlink transmissions at different times over the same frequency. In some embodiments, a Carrier-Sense Multiple Access with Collision Avoidance (CSMA/CA) contention remediation scheme used in the MAC architecture of a conventional 802.11n or 802.11ac system is replaced with a scheduler that allocates time slots to each user. Accordingly, difficulties presented by certain aspects of the architecture (such as the use of sectorized antennas, large coverage areas and problems posed by hidden nodes) are overcome. Since the uplink and downlink use the same frequency, the uplink channel and the downlink channel are more likely to be reciprocal (i.e., channel state information (CSI) associated with the uplink and the downlink will be essentially the same). Having CSI that is essentially the same for both the uplink and downlink allows improvements in the efficiency of the mechanisms for determining the CSI.

The second area relates to scheduling and allocating resources. In some embodiments, scheduling and allocating resources are performed by components of both the baseband and the RF front end acting in cooperation with one another. That is, the baseband components (including a MAC/baseband/Intermediate Frequency (MBI) module in some embodiments) operate essential in accordance with the 802.11 standard and in a manner appropriate to the 2.4/5 GHz spectrum and the system architecture of a WiFi system. The 2.4/5 GHz intermediate frequency (IF) output from the IF module is upconverted to an RF mmWave spectrum (e.g., Ka band frequencies of 26 and 40 GHz) in some embodiments and in a range of 24 GHz to 100 GHz in other embodiments. The RF signal is routed to different antennas and/or polarizations of an antenna in order to direct the RF mmWave signal to the desired destination. Beamforming is performed by the physical structure of the antennas, which directs the RF signal to a particular subsector within a particular base station sector. Accordingly, the combination of allocating resources within the MAC, processing within the MBI module before being upconverting to RF, together with signal switching of the RF signals, determines the destination to which signals are to be transmitted and the source from which signals are to be received. Furthermore, by allocating each spatial stream (SS) output from a MBI module to a unique polarization and subsector within the base station sector associated with that MBI module, advantages are realized in the MIMO operation of mmWave signals transmitted in a line of sight (LOS) communications system. By allocating the SSs of a MBI module to unique combinations of polarization and subsector, a frequency reuse of 1 in each subsector can be achieved with minimal interference between signals transmitted in adjacent subsectors. That is, the same frequency can be reused in each subsector without signals of one subsector interfering with the signals of the adjacent subsectors.

The third area relates to the antennas of the system and how they are constructed to take full advantage of the propagation environment and the characteristics of the signal used in a mmWave communications system. In some embodiments, antennas within both the base station and the customer premises equipment (CPE) have two orthogonal polarizations that allow for independent channels, each of which can be used to transmit/receive one of two orthogonal MIMO channels. In some embodiments, the signals are TDD signals that share the same frequency for both uplink and downlink. By using two orthogonal polarizations of one antenna, each antenna allows both receivers and transmitters in both base stations and CPE to operate as two-antenna MIMO devices using the two polarizations of one antenna as two distinct antennas. In some embodiments, the antennas provide narrow beams with negligible sidelobes, which maximize frequency reuse. In some embodiments, a 60° base station sector can be divided into 4 adjacent 15° subsectors. The beams transmitted in each 15° subsector are sufficiently well defined that, when combined with MIMO techniques, the same frequency can be reused in adjacent subsectors, making it possible to use the same frequency for signals transmitted/received in all subsectors. Signals transmitted on each unique combination of polarization and subsector defines a unique spatial channel.

The details of one or more embodiments of the invention are set forth in the accompanying drawings and the description below. Other features, objects, and advantages of the invention will be apparent from the description and drawings, and from the claims.

DESCRIPTION OF THE DRAWINGS

Like reference numbers and designations in the various drawings indicate like elements.

DETAILED DESCRIPTION OF THE INVENTION

Figure 1:
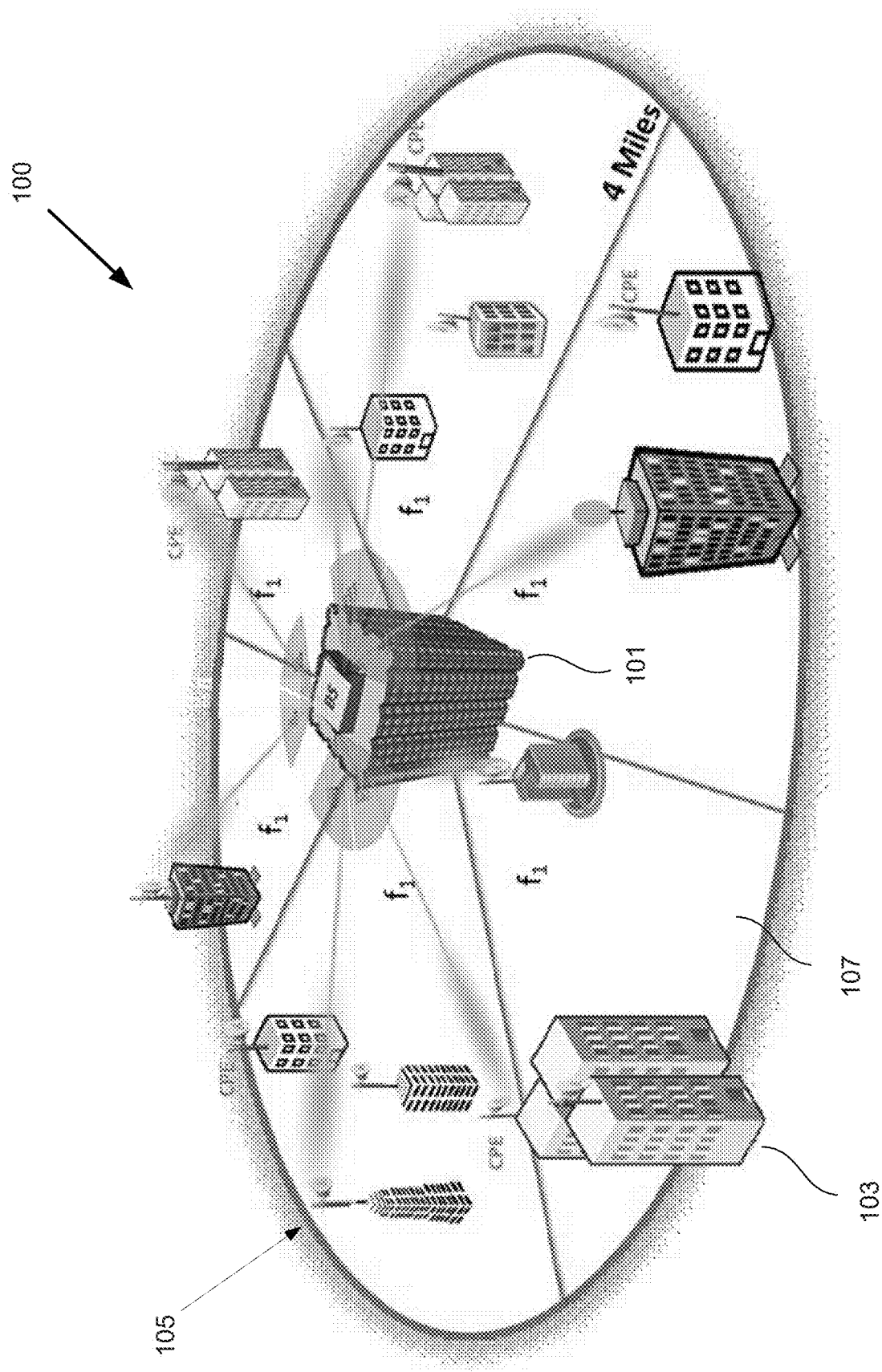
FIG. 1 is an illustration of a base station site and several subscriber units within a millimeter wave (mmWave) communication system

FIG. 1 is an illustration of a base station site 101 and several subscriber units 103 within a millimeter wave (mm-Wave) communication system 100. In some embodiments, several base stations 102 are located at each base station site 101. The base station site 101 serves as a hub for communications to the subscriber units 103. The system provides point-to-multipoint communications from the base station site 101 to each subscriber unit 103 over a "downlink". In addition, the base station site 101 provides multipoint-to-point communications from each subscriber unit 103 to a base station 102 at the base station site 101 over an "uplink". Subscriber units 103 may be located within various types of facilities, such as residential buildings, office buildings, towers of base stations within one or more mobile communications networks. Each subscriber unit 103 includes customer premises equipment (CPE) that supports the functions of the subscriber unit 103. A base station site coverage area 105 (i.e., the geographic area serviced by one or more of the base stations 102 within a base station site 101) is divided into several base station sector coverage areas 107 (hereafter referred to as "sectors" for the sake of brevity). In some embodiments, each base station 102 within the base station site 101 services one sector of the base station site coverage area 105. Accordingly, each base station 102 is associated with a corresponding sector 107. Each base station 102 is responsible for communicating with all of the subscriber units 103 within the corresponding sector 107. In the example shown in FIG. 1, the base station site coverage area 105 is divided into six such sectors 107. For the sake of simplicity, the base station site coverage area 105 is shown in FIG. 1 as a generally circular area with a radius of approximately 4 miles. Each sector 107 is shown as an essentially pie shaped region. However, it should be understood that the actual base station site coverage area 105 will not have a uniform shape, but rather will have a shape that is dependent upon obstructions, terrain and other transmission channel factors. Furthermore, each sector 107 may intersect with one or more adjacent sector 107 to a greater or lesser degree than is shown in the example of FIG. 1. Furthermore, in some embodiments, each sector 107 may have a coverage area that is substantially different in size and shape from one or more of the other sectors 107.

Figure 2:
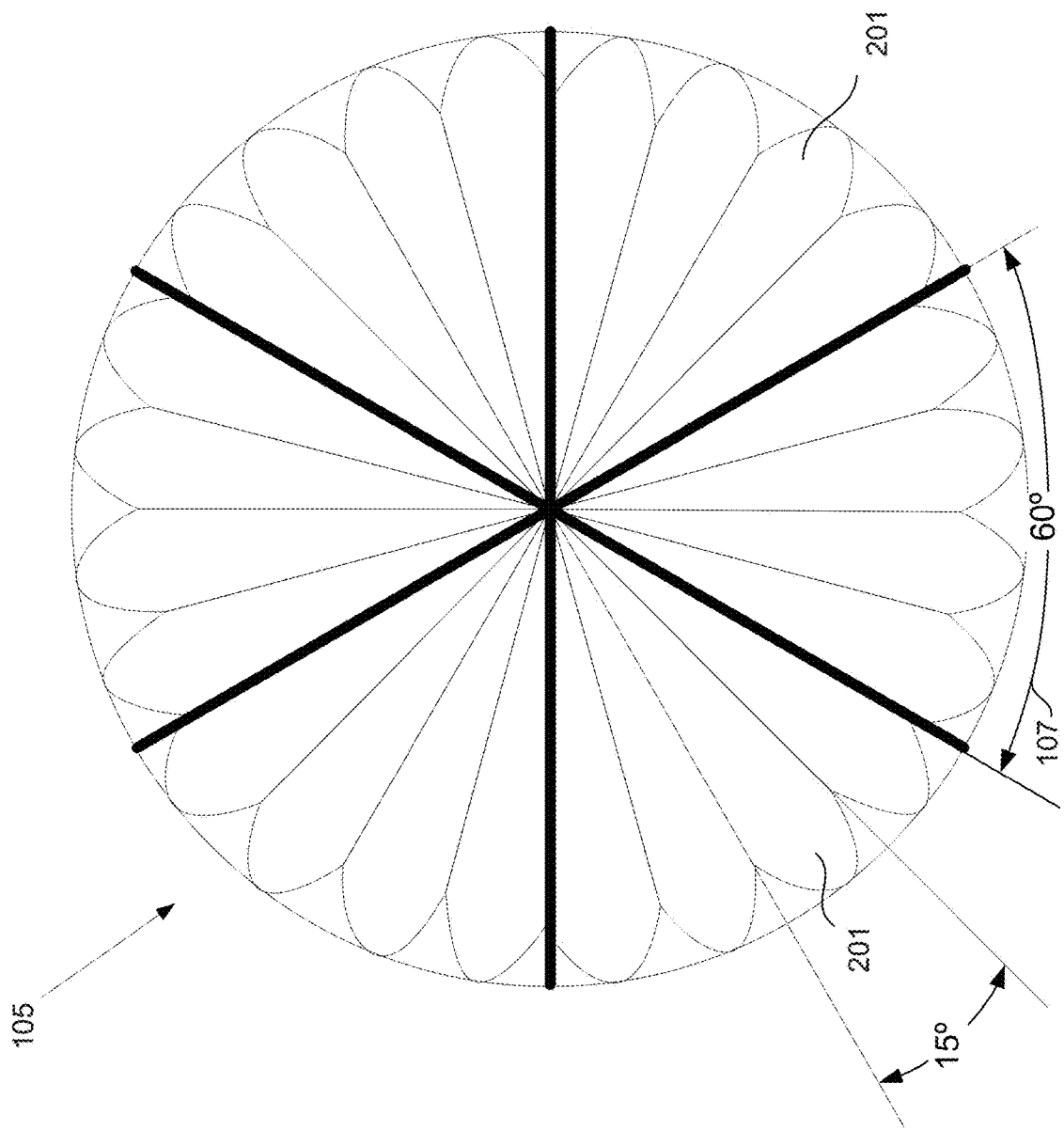
FIG. 2 is another illustration of the base station site coverage area.

FIG. 2 is another illustration of the base station site coverage area 105. In various embodiments of the disclosed method and apparatus, the particular number of sectors 107 may vary from that illustrated in FIG. 1 and FIG. 2. In the example shown in FIG. 2, each sector 107 is divided into four subsectors 201. Each subsector 201 extends out from the base station 101 with an azimuth angle of approximately 15 degrees (i.e., the subsector has an effective 3 dB beamwidth of 15 degrees), wherein the azimuth angle is an angle on an X-Y plane approximately perpendicular to the Earth's radius through the site of the base station 101, the edges of which are defined by a drop in signal power of 3 dB with respect to the boresight of the transmission.

Figure 3B:
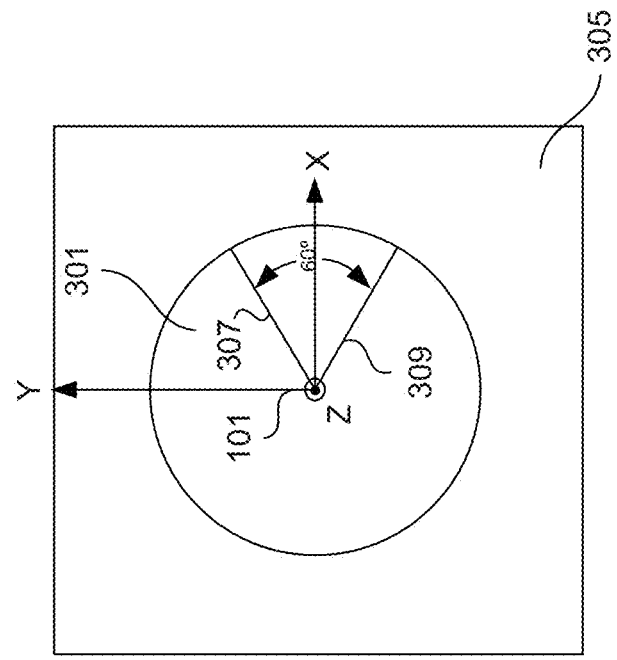
FIG. 3b is an illustration of the Earth, the X-Y plane and a pair of rays emanating from the base station site that define an azimuth angle of degrees.
Figure 3A:
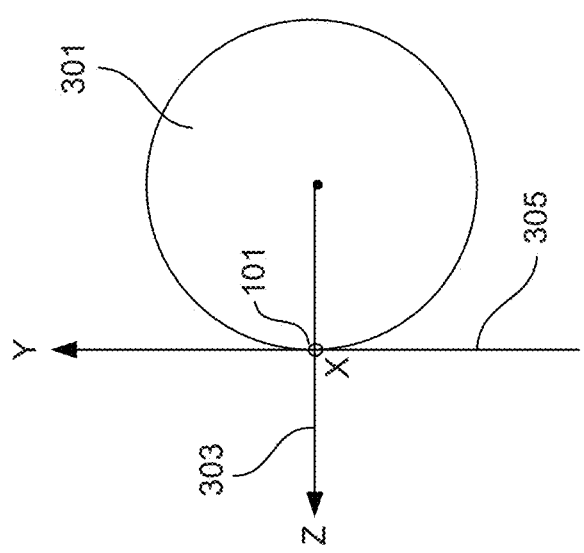
FIG. 3a is an illustration of the Earth, a radius through a base station site on the surface of the earth, and an X-Y plane tangential to the surface of the earth and perpendicular to the radius.

FIG. 3a is an illustration of the Earth 301, a radius 303 through a base station site 101 on the surface of the earth 301, and an X-Y plane 305 tangential to the surface of the earth 301 and perpendicular to the radius 303. FIG. 3a and associated FIG. 3b are provided to establish a geographical reference for the sectors illustrated in FIG. 2. FIG. 3a is oriented such that the X-axis extends outward, the Y-axis extends upward and the Z-axis extends to the left.

FIG. 3b is an illustration of the Earth 301, the X-Y plane 305 and a pair of rays 307, 309 emanating from the base station site 101 that define an azimuth angle of 60 degrees. The orientation of the illustration in FIG. 3b is rotated 90 degrees about the Y-axis with respect to the illustration of FIG. 3a. Accordingly, in FIG. 3b, the Y-axis extends upward, the X-axis extends to the right and the Z-axis extends outward (making the radius 303 extend outward and thus not visible in FIG. 3b). As can be seen in FIG. 3b, azimuth angle lies on the X-Y plane. It should be clear that the radius of the Earth is significantly greater than the dimensions of the base station site coverage area 105. Therefore, that portion of the X-Y plane 305 that is coincident with the base station site coverage area 105 is generally also coincident with the surface of the Earth. Furthermore, rays emanating from the base station site 101 that lie on the plane 305 are projected from the base station site 101 at an elevation angle of zero degrees. However, contours of the Earth's surface can be taken into account when aiming the antennas. Therefore, the center of any beam that is transmitted from a base station 102 within the base station site 101 may be at an elevation angle other than zero degrees.

The particular number and shape of the subsectors 201 may vary from the number shown in the example illustrated in FIG. 2. However, having four subsectors is compatible with a system in which a 802.11 compliant MAC provides up to 8 spatial streams, two of which can transmitted into each subsector with each of the two being transmitted on a different polarization. In some such embodiments each of the two polarizations associated with one subsector are orthogonal. A sub-sector antenna (not shown in FIG. 1 or 2) is associated with each corresponding polarization of each subsector and defines the shape and size of the subsectors 201 within the sector 107, as will be discussed in greater detail below. Accordingly, in such embodiments, there are 8 such subsector antennas within each sector.

As is the case with the sectors 107, each subsector 201 can have a substantially different size and shape from that of the other subsectors 201 within the same sector 107 or from the other subsectors 201 in each other sectors 107. Furthermore, in some embodiments, there may be more or less than 6 sectors, each with more or less than 4 subsectors. In some embodiments, the sum of all of the azimuth angles for each sector may not be equal to 360 degrees. Accordingly, there may be some holes in the coverage where no subscriber units are expected to be present, or in other embodiments, there may be an overlap in the coverage of two or more adjacent sectors. In addition, in some embodiments, the number of subsectors may vary from one sector to another and one or more subsectors may have different azimuth angles than one or more of the subsectors within the same sector or within other subsectors.

Figure 4:
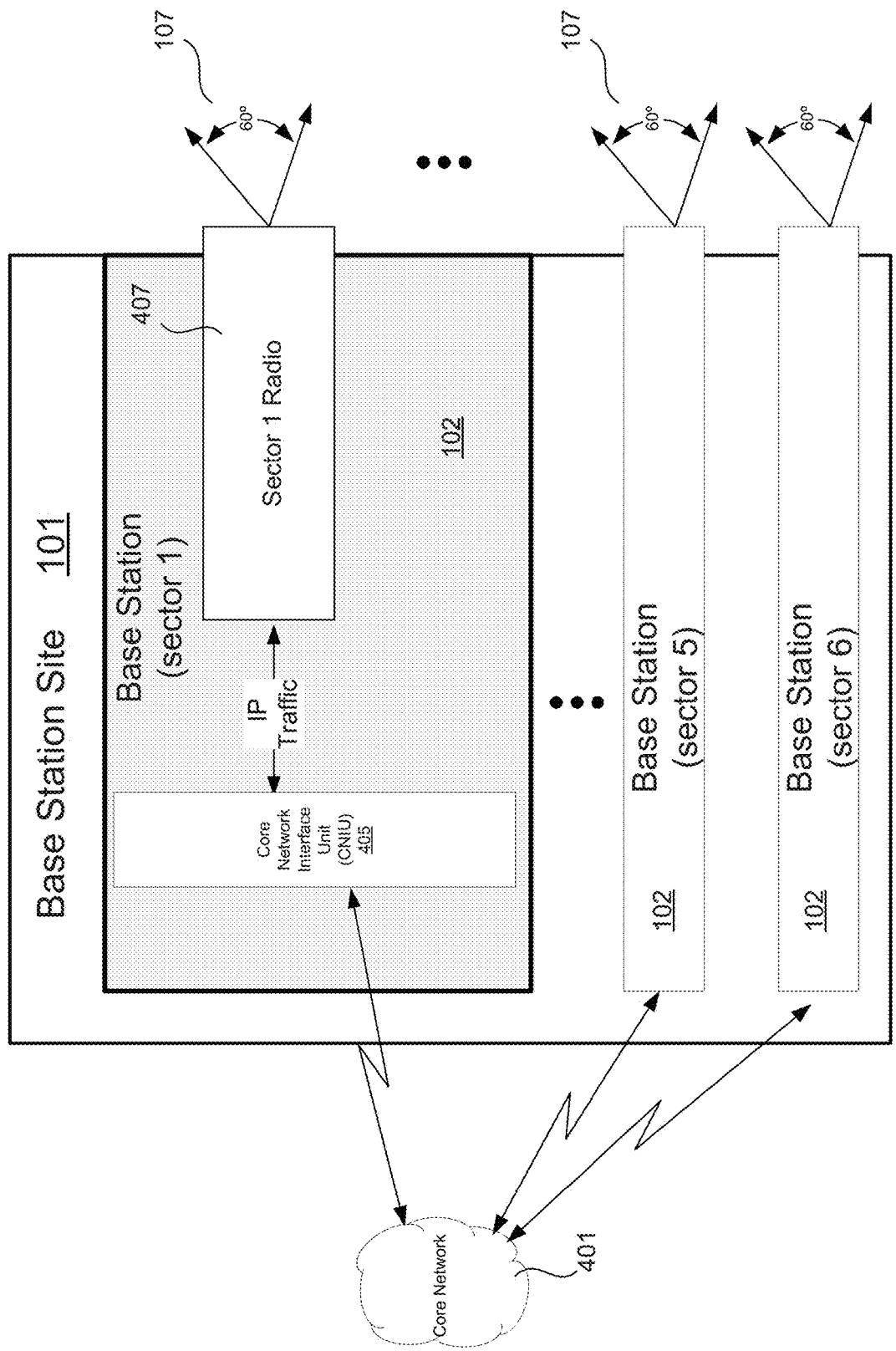
FIG. 4 is a simplified block diagram of a plurality of base stations within a base station site.

FIG. 4 is a simplified block diagram of a plurality of base stations 102 within a base station site 101. In the example shown in FIG. 4, the base station site 101 has 6 base stations 102. Accordingly, there are 6 sectors 107 in the base station site coverage area 105. Each sector 107 is serviced by a base station 102 having a coverage area with an azimuth angle of approximately 60 degrees. In some embodiments, each base station 102 has a core network interface unit (CNIU) 405. The CNIU 405 provides a means by which the base station 102 can communicate with other nodes on a core network 501. Accordingly, in some embodiments, the CNIU 405 provides access to other base stations at other base station sites or other base stations located at the same base station site 101.

Figure 5:
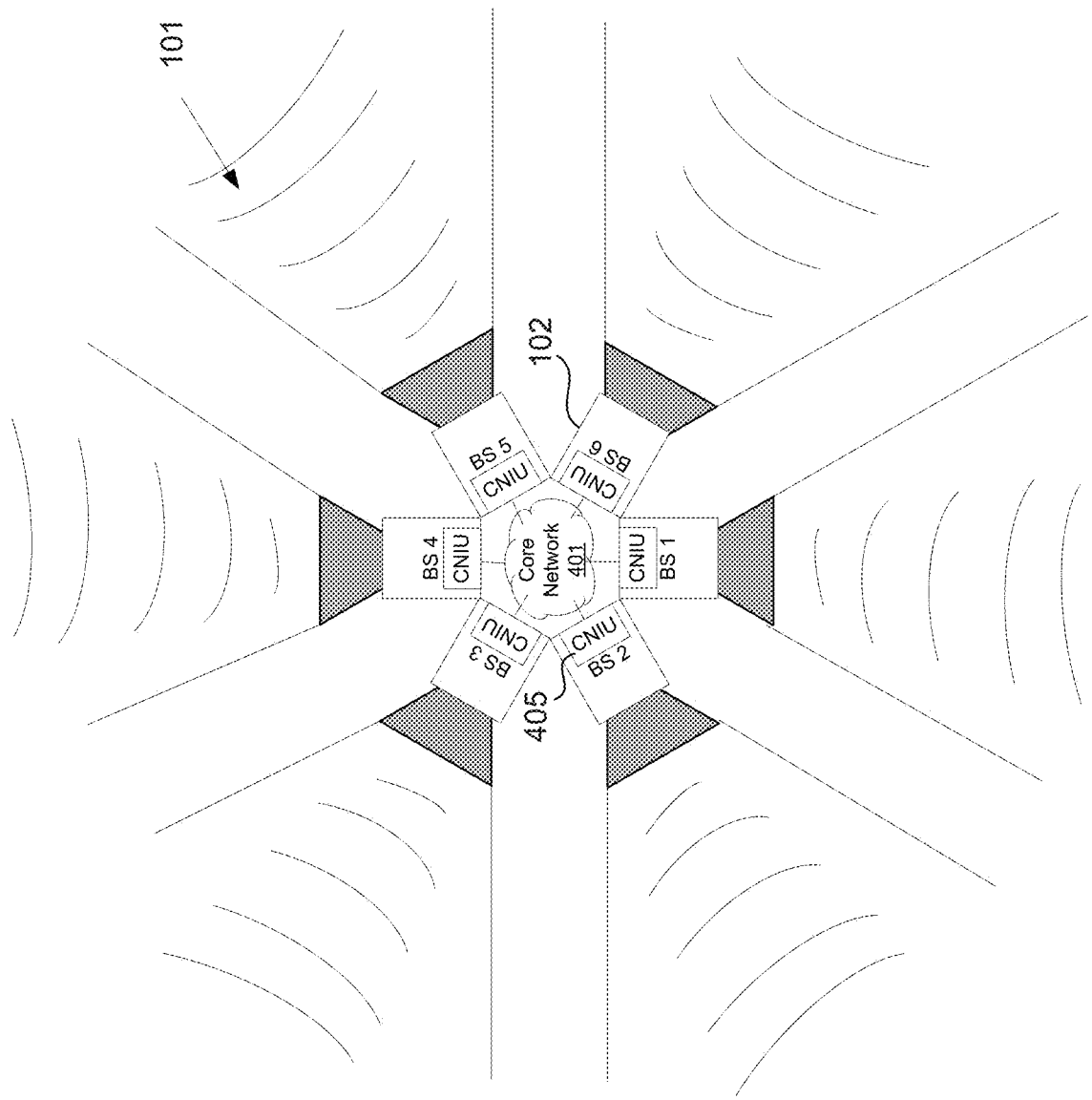
FIG. 5 is an illustration showing the base stations of a base station site.
Figure 6:
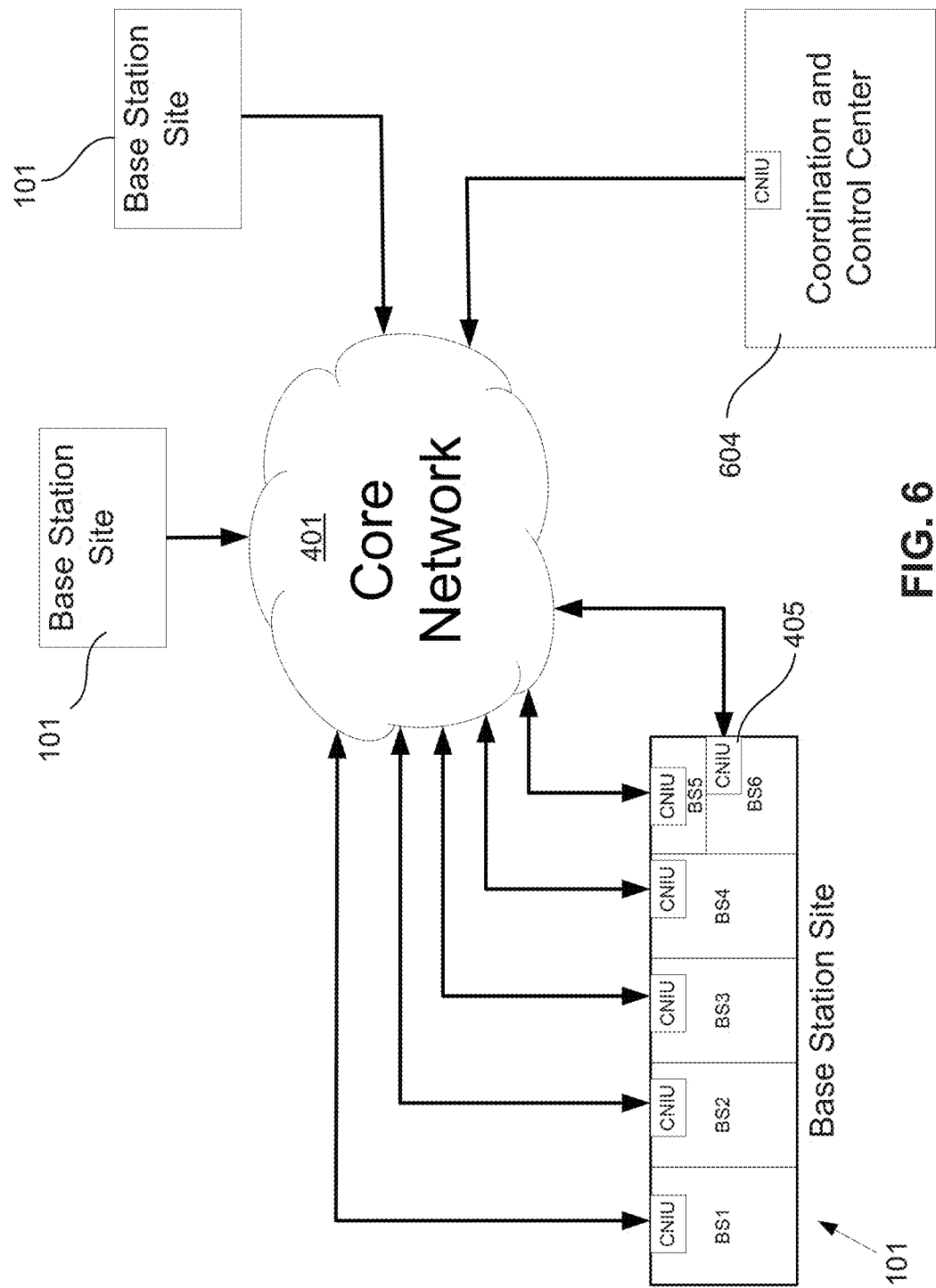
FIG. 6 shows another illustration of such a system in which several base station sites and a Coordination and Control Center (CCC) are coupled to the core network.

FIG. 5 is an illustration showing the base stations 102 of a base station site 101. Each of the six base stations 102 are coupled to a core network 501 in accordance with some embodiments of a communication system. Only one base station site 101 is shown in FIG. 5 for the sake of simplicity. However, FIG. 6 shows another illustration of such a system in which several base station sites 101 and a Coordination and Control Center (CCC) 604 are coupled to the core network 501. The CCC 604 has a CNIU 405. The CNIU 405 allows the CCC 604 to be a node on the Core Network 502. In FIG. 6, the base stations 102 and core network interface unit of only one base station site 101 are shown. The other two base station sites 101 are shown as blocks for the sake of simplicity. In some such embodiments, the CCCs 604 coordinate operations between base stations 102 within each base station site 101.

The base station 102 provides a means by which subscriber units 103 can be connected to devices that are part of a private network, public network or the Internet through devices (such as Internet gateways) connected to the core network. In addition, in some embodiments, the base station 102 can provide communication links through sector radios 407 of the base station 102 to allow two or more of the subscriber units 103 to communicate with each other through the base station 102.

Figure 7:
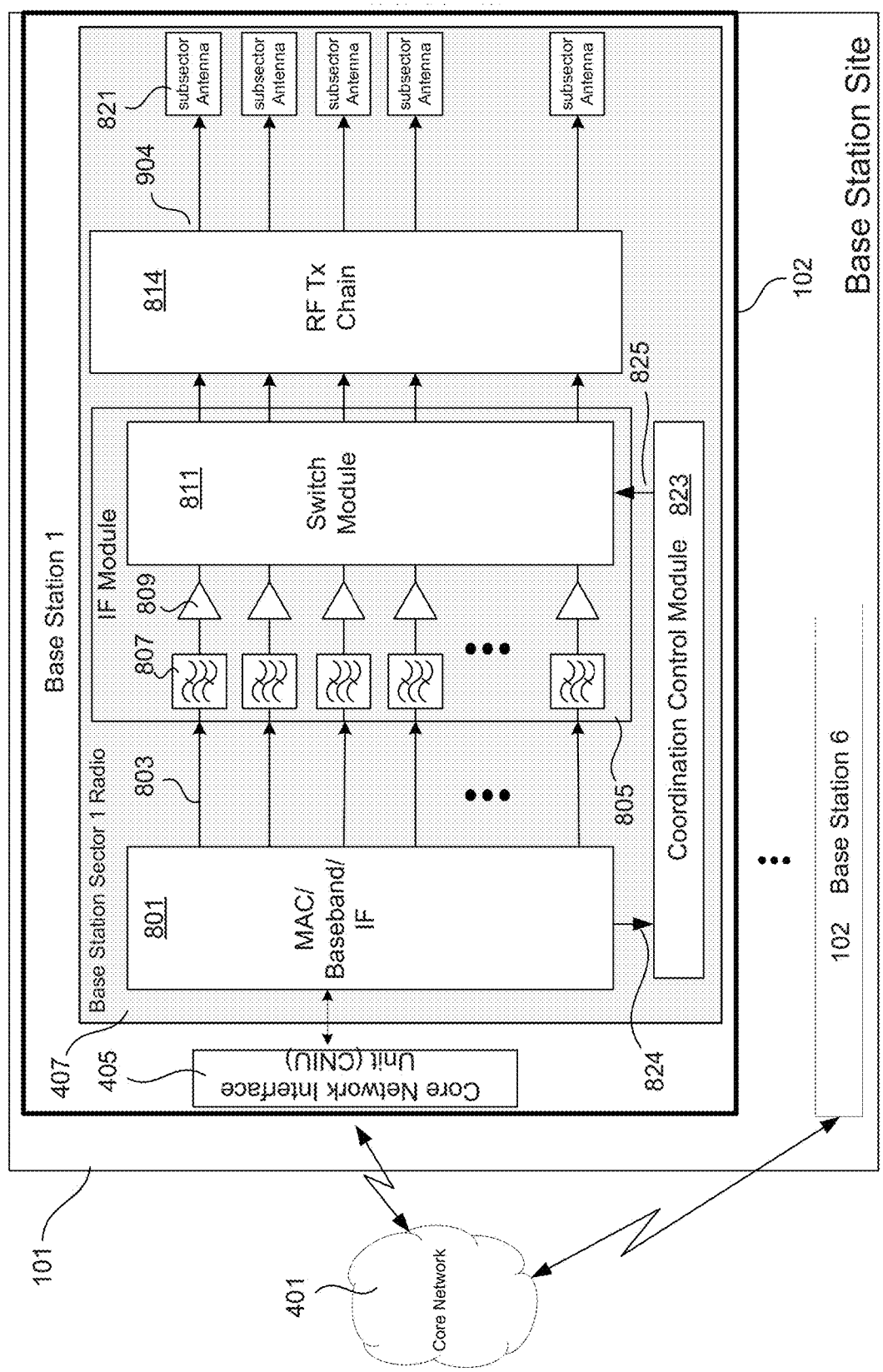
FIG. 7 is a simplified block diagram of one example of some portions of a base station site, including some of the details of the transmit portion of a base station sector radio.

FIG. 7 is a simplified block diagram of one example of some portions of a base station site 101, including some of the details of the transmit portion of a base station sector radio 407. For the sake of simplicity, only one base station sector radio 407 is shown in detail. In addition, only the transmit related components are shown in FIG. 7.

In the example shown in FIG. 7, each base station 102 transmits mmWave signals into the sector 107 corresponding to that base station 102. Each of the six base stations 102 has a corresponding base station sector radio 407. In some embodiments, each such base station sector radio 407 has essentially the same architecture. However, in other embodiments, the architecture of one or more of the base station sector radios 407 may differ from the rest. In some such embodiments, each of the base station sector radios 407 has an architecture that is uniquely configured for the needs of the particular sector 107 that the radio 407 services.

In one example of a base station 102 shown in FIG. 7, signals containing content to be transmitted by the radio 407 are coupled from the CNIU 405 to a MAC/Baseband/Intermediate Frequency (MBI) module 801.

Figure 8:
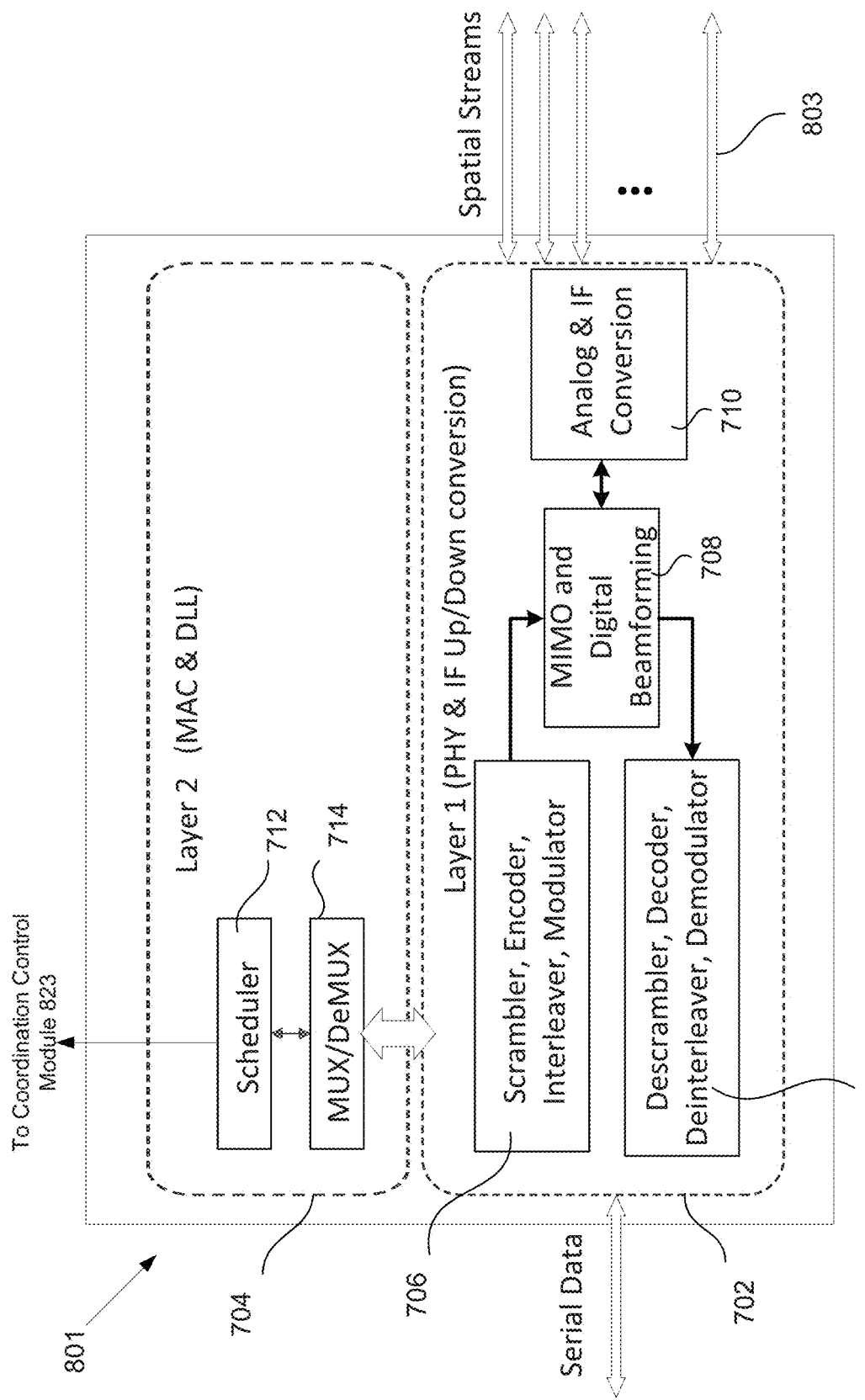
FIG. 8 is a functional block diagram of some of the relevant functions of an MBI module in accordance with some embodiments of the disclosed method and apparatus.

FIG. 8 is a functional block diagram of some of the relevant functions of an MBI module 801 in accordance with some embodiments of the disclosed method and apparatus. It should be clear to those skilled in the art that other functions may be present in the MBI 801, but are not disclosed here as they are not relevant to the disclosed method and apparatus. In some embodiments of the disclosed method and apparatus, the MBI module 801 comprises at least a first layer (Layer 1) 702 and a second layer (Layer 2) 704 of functionality in accordance with the well-known OSI (Open Systems Interconnection) Reference Model. OSI is reference model for how applications communicate over a network. Layer 1 702 receives and provides content in the form of serial baseband data to be communicated between the base station 102 and the subscriber units 103. In some embodiments, data received by the MBI module 801 is presented to a SEIM (Scramble, Encode, Interleave, Modulate) module 706 in which the data is scrambled, encoded, interleaved and modulated. In some embodiments, such scrambling, encoding, interleaving and modulating is performed in accordance with IEEE 802.11. In some embodiments, the modulated output of the SEIM module 706 coupled to a MDB (MIMO and Digital Beamforming) module 708. In some such embodiments, the MDB module 708 performs functions necessary to generate a plurality of spatial streams. In some such embodiments, the MDB module 708 generates the spatial streams in accordance with IEEE 802.11, including managing the performance of CSI operations. The output of the MDB module 708 is coupled to an analog & IF conversion module 710. The analog & IF conversion module 710 upconverts the data provided by the MDB module 708 from baseband to IF (i.e., to a plurality of 2.4/5 GHz spatial streams). In addition, in some embodiments, filtering and amplification may be provided by the analog & IF conversion module 710.

In some embodiments, the second layer 704 comprises scheduler 712 that determines when content is to be transmitted and received by the base station 102. The second layer also comprises a MUX/DEMUX 714. The MUX/DEMUX 714 receives content from Layer 1 702, reorganizes the content as appropriate for transmission to the subscriber units 103, and provides the content back to Layer 1 702 for transmission to the subscriber units 103. In addition, the scheduler 712 determines on which spatial streams content is to be modulated and if OFDM or OFDMA modulation is used, what content is to be modulated in each OFDM subcarrier. Similarly, when content is received from subscriber units 103, the MUX/DEMUX 714 reorganizes the data for transmission to the core network 401.

Scheduling and routing is similar to what is commonly performed by the MAC of an 802.11 access point. It should be noted, as was mentioned previously, that the 2.4/5 GHz spatial streams 803 output from the MBI module 801 are what would commonly be output as RF signals from an 802.11 WiFi access point. However, the spatial streams 803 output from the MBI module 801, rather than being transmitted over the air, are coupled to an IF module 805. As is discussed in more detail below, the IF module 805 conditions the signals for transmission to the subscriber units 103.

The MBI module 801 is capable of providing spatial division, time division and frequency division spatial streams 803 at IF. That is, the MBI module 801 is capable of outputting spatial streams 803 that carry unique information through different outputs that are coupled to spatially diverse antennas, and thus provide spatial division.

In addition, the MBI module 801 is capable of outputting spatial streams 803 to each output, wherein each such spatial stream has unique content at different times. Thus, the outputs provide time division multiplexed signals. Still further, the MBI module 801 is capable of providing unique content concurrently through each output at different frequencies, thus provide frequency division multiplexed signals. In some such embodiments, the MBI module 801 functions like an 802.11 module (i.e., like a module capable of operating in conformance with one of the following: industry standard 802.11n, 802.11ac, 802.11ax, etc.). In some embodiments, the MBI module 801 implements a technique commonly referred to as multiple-input multiple-output (MIMO) to generate spatial division outputs. Each spatial division output is commonly referred to as a "spatial stream" (SS). In some embodiments, such as those that have a MBI module 801 that operates in conformance with 802.11ac or 802.11ax, or future 802.11 technologies, the MBI module 801 may have eight output ports that each output one SS 803. The scheduler 712 within the MBI module 801 (which in some embodiments is within the 802.11 module of the MBI module 801) performs scheduling and routing by determining how the content that is coupled to the MBI module 801 is to be assigned to each SS 803. In addition to determining which SS 803 the content is to be assigned, the scheduler 712 also determines time and frequency division allocations. That is, the scheduler 712 determines in what time slot and to which frequency the content is to be applied in each particular SS 803.

In some embodiments, each SS 803 is associated with a corresponding TX input to the IF module 805. In some such embodiments, the IF module 805 comprises a switch module 811 and several filters 807, each filter 807 associated with a corresponding amplifier 809. Since FIG. 7 shows only components that are associated with the transmit function, only those TX amplifiers 809 and TX filters 807 that are in the transmit signal path are shown in FIG. 7.

Each TX output from the MBI module 801 is associated with a corresponding one of the IF module TX inputs and the corresponding TX filter 807. The output of each TX filter 807 is coupled to the input of the corresponding TX amplifier 809. It will be understood by those skilled in the art that the use of particular amplifiers and filters will depend upon the requirements of each particular system. Therefore, it should be understood that the configurations disclosed herein are merely provided as examples of systems. Therefore, significant variations in the amount of filtration and amplification are within the scope of the disclosed method and apparatus.

The output of each TX amplifier 809 is associated with, and coupled to, a corresponding TX input to a switch module 811 within the IF module 805. The switch module 811 comprises a switch network that makes it possible to selectively connect any one input to any one output. Likewise, each output can be connected to any one input. Therefore, there is a selectable one-to-one correspondence between TX inputs and TX outputs of the switch module 811. Other embodiments may provide a switch module that is capable of selectively connecting one or more inputs to one or more outputs. Each TX output from the switch module 811 is associated with a corresponding input to an RF transmit (TX) chain 814. It should be noted that the switch module 811 also comprises RX inputs and RX outputs that will be discussed further below with respect to FIG. 10 and FIG. 11.

While the MBI 801 shown in FIG. 7 has several TX outputs, in some embodiments, the MBI 801 may have as few as two TX outputs, each associated with a corresponding one of two subsector antennas 821. In some such embodiments, the two subsector antennas 821 are focused into the same subsector and transmit signals with different polarizations (e.g., horizontal polarization and vertical polarization).

Figure 9:
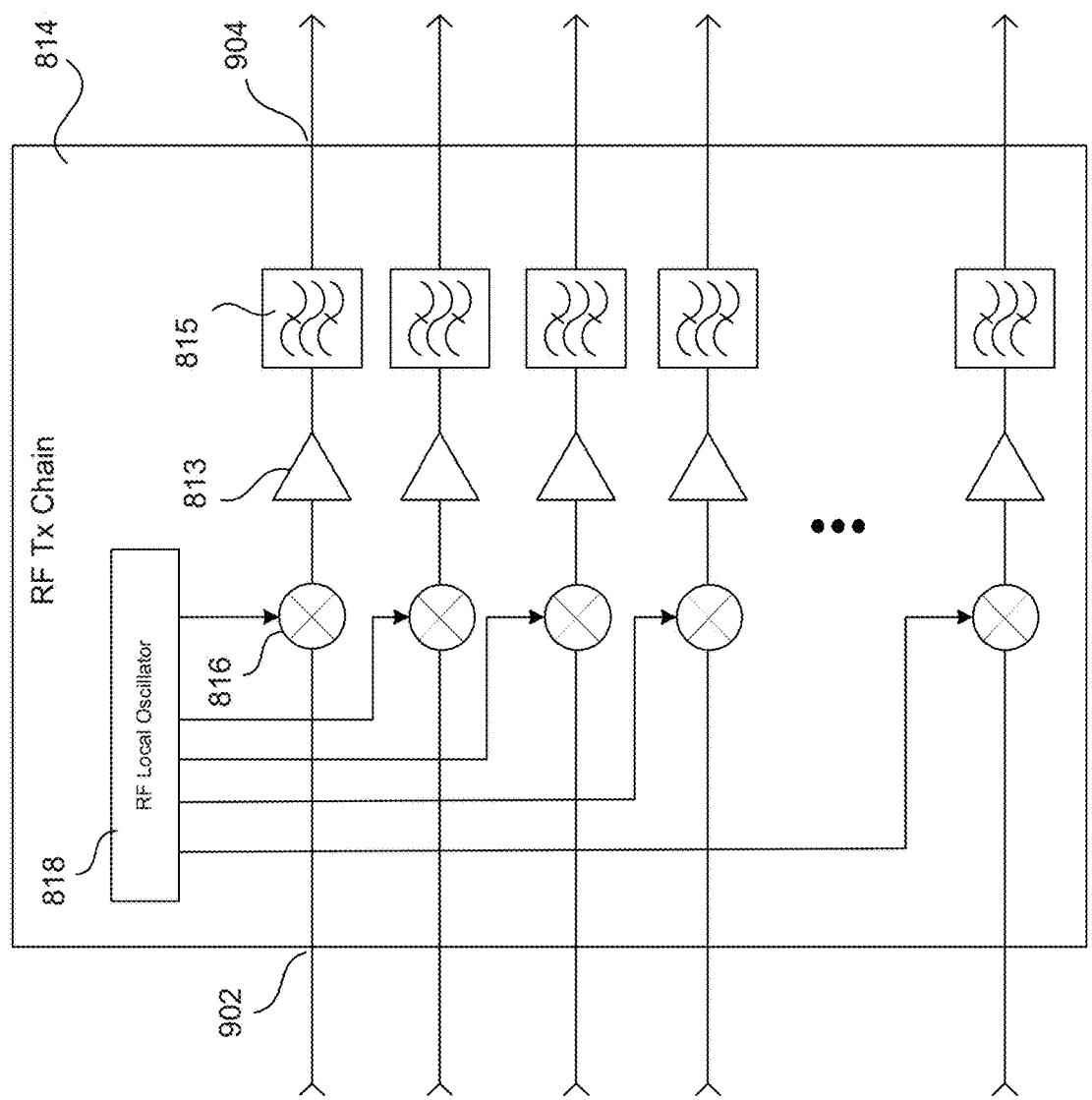
FIG. 9 is a simplified block schematic of the components of the RF TX chain 814. The RF TX chain 814 has several inputs.

FIG. 9 is a simplified block schematic of the components of the RF TX chain 814. The RF TX chain 814 has several inputs 902. Each input 902 is associated with a corresponding frequency converter 816, amplifier 813, filter 815 and output 904. Each RF TX chain input is coupled to a corresponding IF input of the corresponding frequency converter 816. A local oscillator 818 provides a local oscillator signal to each frequency converter 816. Each frequency converter 816 mixes the input signal with the local oscillator signal to upconvert the IF signal to a millimeter wave frequency that is output from the frequency converter 816. The upconverted signal output from each frequency converter is coupled to the corresponding amplifier 813. The output of each amplifier 813 is coupled to the input of the corresponding filter 815. It should be noted that in some embodiments, the MBI 801 outputs an IF signal at a frequency of either 2.4 GHz or 5 GHz, which is the frequency output by an 802.11 compliant device (and commonly referred to as an "RF frequency" in the context of a WiFi system). In some embodiments, that 2.4/5 GHz IF signal is then upconverted by the frequency converter 816 to an RF mmWave frequency in the range of 24-100 GHz. Accordingly, since the 2.4/5 GHz signal is an "intermediate" frequency between baseband and the RF mmWave frequency, it is termed "IF" in the context of the disclosed method and apparatus.

Referring back to FIG. 7, each output 904 from the RF TX chain 814 is associated with, and coupled to, a corresponding input to a subsector antenna 821. Each input to the subsector antenna 821 is configured to form a beam directed to a corresponding subsector 201 of the sector 107 serviced by the base station sector radio 407. In some embodiments, there are two inputs focused into the same subsector 201. The first is applied to elements of the antenna that polarize the signal in a first polarization. The second is applied to elements of the antenna that polarize the signal in a second polarization orthogonal to the first polarization. For example, in some embodiments, a first input to the sector antenna 821 is coupled to elements that transmit signals in a beam focused upon a first subsector 201 and having a horizontal polarization. A second input to the sector antenna is coupled to elements that transmit signals in a beam focused upon a second subsector 201 and having a vertical polarization. Therefore, by selecting a particular output of the switch module 811 to which a particular input of the switch module 811 is to be coupled, the signal output from the amplifier 809 is selected for transmission on a transmission beam that is focused into the subsector 201 associated with the selected switch module output. In some embodiments, selecting a particular output further determines the polarization on which the signal will be transmitted. In the embodiment in which there are four subsectors 201, there eight subsector antennas 821. The subsector antennas 821 are paired such that each pair of subsector antennas 821 is focused to transmit beams into one of the four subsectors. A first subsector antenna 821 of each pair transmits signals having a first of two orthogonal polarizations (e.g., vertical or horizontal). The second subsector antenna 821 of the pair transmits signals on the second of the two orthogonal polarizations. Accordingly, each output of the switch module 811 is associated with a corresponding subsector antenna 821 focused to transmit a signal into a unique one of the four subsectors 201. Furthermore, the combination of polarization and subsector 201 is unique for each output of the switch module 811.

Ideally, in a typical 802.11 configuration, such as an 802.11ax configuration, each SS 803 is coupled to a different antenna to provide the spatial diversity desired to implement a MIMO transmission. In the embodiment of FIG. 7, a multi-user MIMO system is used in which each pair of SSs carries different content to subscriber units 103 in a different subsector 201. At least two antennas within the receiver of each subscriber unit 103 can receive signals from the subsector antennas 821 of the transmitter that transmit beams into the subsector 201 in which the subscriber unit 103 resides. Some typical 802.11 systems take advantage of MIMO techniques to increase the system throughput. Multipath channels are created by the creation of different signal paths that form as a consequence of the signals reflecting off various objects along the path between the transmitter and the receiver, creating associated different delays for each signal path. However, in accordance with some embodiments of the disclosed method and apparatus, rather than relying upon signals encountering multipath channels between the transmit antennas and the receive antennas, each SS is transmitted on a transmission beam that is focused into a unique subsector 201 of the sector 107 on a unique polarization. In some embodiments, two SSs are transmitted into the same subsector 201. However, the two signals are transmitted on beams that have orthogonal polarizations. By virtue of the signals being transmitted through elements of the transmit antenna that are either on different polarizations or directed at different subsectors 201, the signals will be in different channels for the purpose of the MIMO system, similar to the different spatial channels in a typical 802.11 MIMO configuration. A coordination control module 823 coordinates the assignment of SSs output from the MBI module 801 with the switch module 811 (i.e., the selection of the output to which each particular SS is coupled by the switch module 811).

In other embodiments, signals that are not completely orthogonal may be transmitted into the same subsector 201. In such embodiments, a technique commonly known as non-orthogonal multiple access (NOMA) is used in which such signals that are not completely orthogonal are transmitted on the same frequency and at the same time into the same space, relying upon a difference in polarization (or other factor that can be used to distinguish signals), but wherein the signals are not completely orthogonal. For example, a first signal may have polarization that is between horizontal and vertical (e.g., at 45 degrees from horizontal), while other signals are either strictly horizontal, strictly vertical, or 90 degrees from the first signal. While some such signals are not orthogonal, the difference in polarization is sufficient to provide some measure of separation that provides the receiver with a limited capability to distinguish the signals from one another. Therefore, while the separation of the signals is not nearly as great as is the case for orthogonal polarizations, there is sufficient separation to provide some advantages that, when taken together with the increase in throughput, offset the negative impact of distortion created by the cross contamination of the signals.

In some embodiments of the disclosed method and apparatus, the scheduler 712 is responsible for allocating resources to each subscriber unit 103. That is, the scheduler 712 determines which SS 803 at which frequencies and at which time is to be used to transmit content to each particular subscriber unit 103. It should be noted that in addition to providing signals with time division, frequency division and spatial division, the signals provided by the MBI module 801 may be modulated using orthogonal frequency division multiplexing (OFDM). In some cases, the content modulated on various OFDM subcarriers may be intended for reception by different subscriber units 103 (i.e., orthogonal frequency division multiple access (OFDMA)). Alternatively, different OFDM subcarriers may carry different data streams intended for the same subscriber unit 103. In some embodiments, the MBI module 801 receives instructions from the coordination control module 823 that assist the MBI module 801 and the MAC component within the MBI module 801 to determine the manner in which the resources are to be allocated.

In many ways, the operation of the scheduler 712 of the disclosed method and apparatus is similar to the operation of a MAC within a conventional 802.11n, 802.11ac or 802.11ax system. That is, the scheduler 712 need not treat the SSs 803 that are output any different from those SSs that are output from a MAC of a conventional 802.11 system. However, because SSs 803 are transmitted to the subscriber units 103 residing in different subsectors using different subsector antennas 821, determinations of Channel State Information (CSI) need to be coordinated by the scheduler 712 to be synchronized with the switch module 811 within the IF module 805. For example, the channel from the base station 102 to a particular subscriber unit 103 depends upon the subsector 201 in which the subscriber unit 103 is located. The coordination control module 823 performs the function of controlling the switch module 811 in coordination with the scheduler 712 of the MBI module 801. For example, in some embodiments, when the CSI is being measured by Layer 1 702 for the channel from a first output of the MBI module 801 during transmission from a first subsector antenna 821, the switch module 811 is controlled to ensure that the first output from the MBI module 801 is coupled to the first subsector antenna 821. In some embodiments, a control signal is coupled on a line 824 from the MBI module 801 to the coordination control module 823 to allow the MBI module 801 to control and coordinate operation of the switch module 811 during a CSI procedure. In some embodiments, the switch module 811 is controlled by a signal output on a signal line 825 from the coordination control module 823. Similarly, each other output from the MBI module 801 is coupled to the appropriate subsector antenna 821 during measurements of the channel between the base station 102 and the subscriber unit 103 at issue. A further discussion regarding the determination of CSI for each channel is provided below. Once the CSI procedure is complete, the coordination control module 823 ensures that the signals that are output from the MBI module 801 are coupled to the appropriate subsector antenna 821 for transmission of MIMO signals from the base station 101 to each subscriber unit 103 to which the base station 101 is communicating. In some embodiments, such as the embodiment shown in FIG. 6, the coordination control module 823 is coupled to the MBI module 801 and also to the IF module 805. In particular, in some embodiments, the coordination control module 823 is coupled to the switch module 811 in the IF module 805.

For MIMO operations, CSI regarding the channels between the various antennas at the base station 102 and the antennas of each subscriber unit 103 must be determined. The CSI information is used by the base station to pre-code transmissions to subscriber units taking into account distortions that occur due to the nature of the transmission channel between the transmitter and the receiver. Conventions and protocols for attaining CSI are provided in the 802.11 standard. In particular, there are two protocols that are provided in 802.11 for attaining CSI. The first is referred to as "Implicit" and the second is referred to as "Explicit".

In accordance with the Explicit technique for determining CSI, the base station 102 sends a "null data packet announcement" (NDPA) frame to the subscriber units. Usually, the NDPA frame contains the address of the intended subscriber units, the type of feedback requested and the spatial rank of the requested feedback. The base station 102 then sends a "sounding frame" known as a "null data packet" (NDP) frame. The NDP contains a physical layer (PHY) preamble with long training fields (LTFs), short training fields (STFs) and a signal (SIG) field. The NDP contains no data. The subscriber unit 103 then analyzes the NDP and provides back a report for each receive antenna (i.e., each SS). The base station 102 then uses the report to precode further transmissions to those subscriber units 103 from which reports were received. The reports are typically relatively large and require a significant amount of bandwidth. In some embodiments, such precoding is done by a combination of the coordination control module 1023 and the MBI module 801. In particular, in some embodiments, Layer 1 702 of the MBI module 801 applies precoding to signals output from the MBI module 801. In some embodiments, the coordination control module 823 may be coupled to the amplifier 813.

In accordance with the implicit technique for determining the CSI, the base station 102 requests the subscriber unit 103 to send the NDP frame. The base station 102 can then determine the precoding of the transmissions to the subscriber unit 103 based on the NDP frame without the report having to be communicated. This saves a substantial amount of bandwidth in the CSI procedure. However, in order to use the implicit technique, the uplink and downlink have to be reciprocal. While some differences may occur between the uplink and downlink of a mmWave system using TDD, the differences can typically be considered to be negligible when conditioning (e.g., precoding) the signals. That is, because the same frequency is used for both the uplink and the downlink, the channel characteristics will typically be the same or close enough to allow the information derived from the uplink to be used to precode signals on the downlink.

Accordingly, the implicit CSI procedure defined by the 802.11 standard can be used with a modification that the SSs output from the MBI module 801 have to be coordinated with the operation of the switch module 811 to ensure that the signals are transmitted to the desired subsector antennas, and thus to the intended subscriber units 103.

As noted above, in addition to coordinating the CSI operations, the coordination control module 823 is also responsible for ensuring that SSs output from the MBI module 801 are routed by the switch module 811 to the appropriate feed of the appropriate subsector antenna 821 during normal operation. That is, the coordination control module 823 is responsible for ensuring that each SS output from the MBI module 801 is transmitted on the correct polarization and subsector antenna 821. In some embodiments, the coordination control module 823 has an output that is coupled over a signal line 824 to an input of the MBI module 801. The output from the coordination module 823 provides information that allows the MBI module 801 to determine that the CSI procedure can be performed (i.e., that the output from the MBI module 801 associated with channel being measured is coupled to the appropriate subsector antenna 821).

Figure 10:
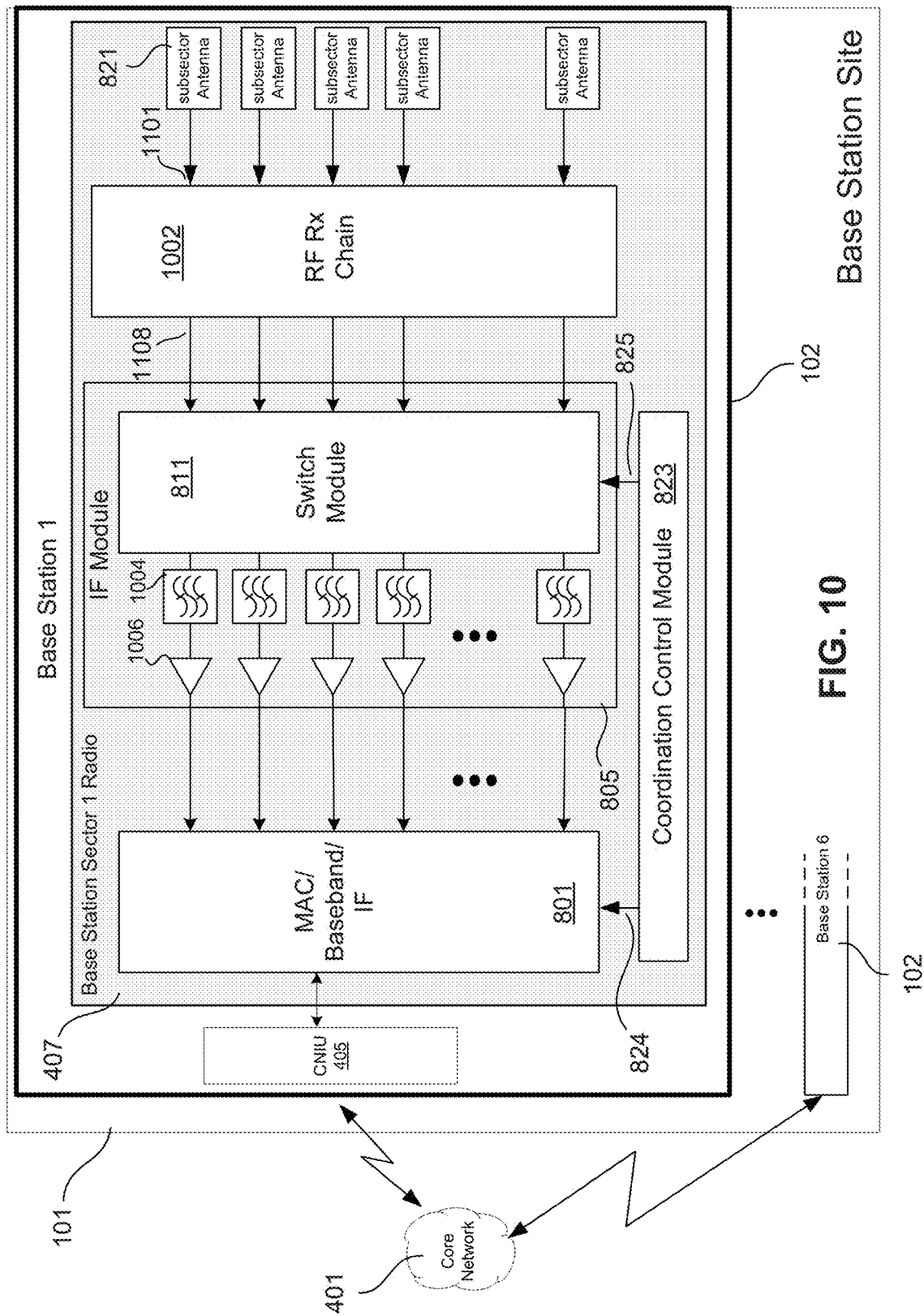
FIG. 10 is a simplified block diagram of one example of some portions of a base station site, illustrating some of the details of the receive portion of a base station sector radio.

FIG. 10 is a simplified block diagram of one example of some portions of a base station site 101, illustrating some of the details of the receive portion of a base station sector radio 407. For the sake of simplicity, only one base station sector radio 407 is shown in detail. In addition, only the components relevant to the receiver operation of the base station 102 are shown in FIG. 10. The operation of the receive sections of the base station 102 are similar to the operation of the transmit section. However, the signal flow is from the subsector antenna 821 to the MBI 801. Signals received by the subsector antennas 821 are coupled to an RF receive (RX) chain 1002.

Figure 11:
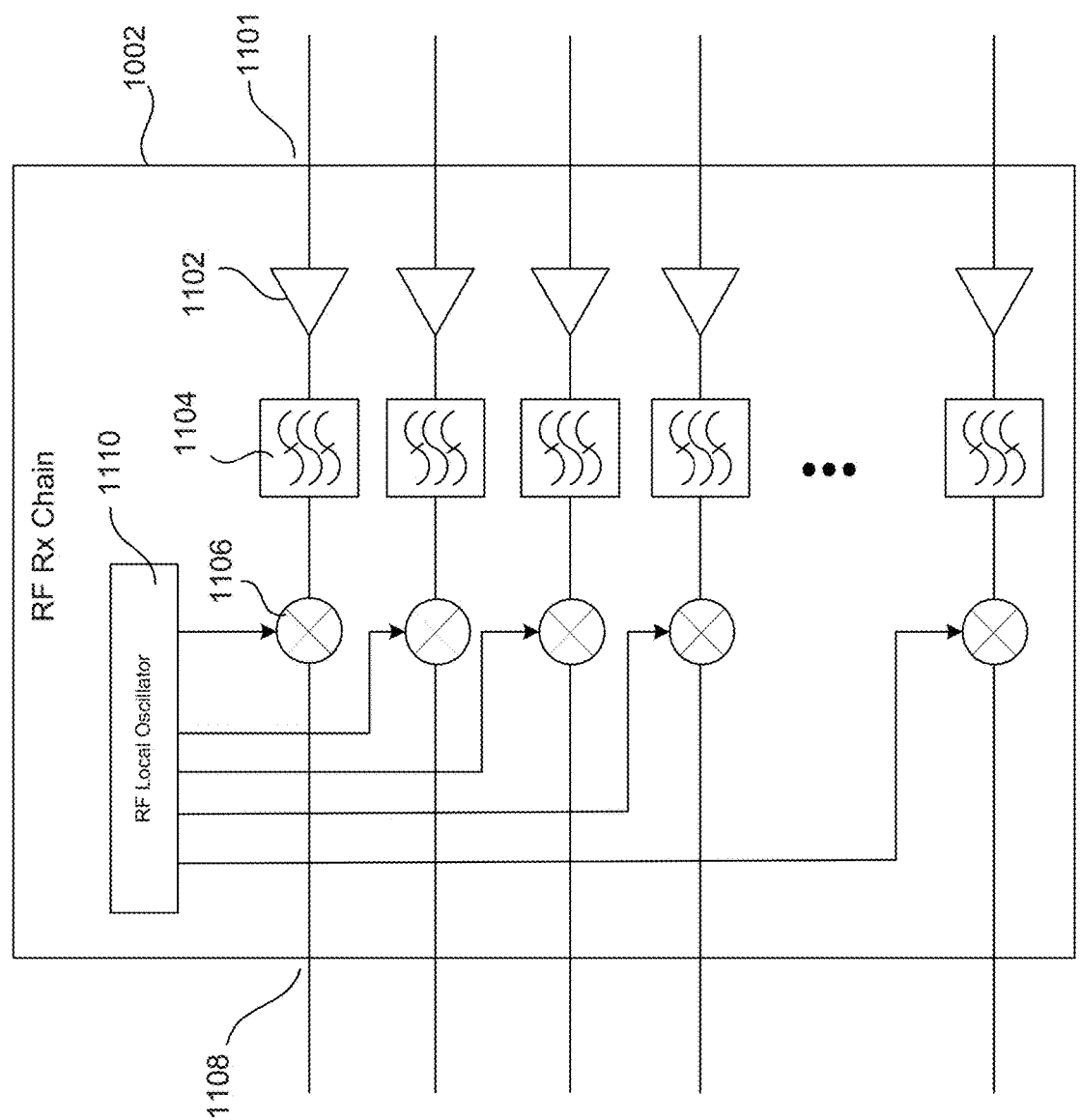
FIG. 11 is a simplified schematic of the components of the RF receive chain.

FIG. 11 is a simplified schematic of the components of the RF receive chain 1002. Each input 1101 of the RF receive chain 1002 is associated with a corresponding amplifier 1102 (typically a low noise amplifier (LNA)), filter 1104, frequency converter 1106 and output 1108. Signals coupled to the RF receive chain 1002 are coupled to the input of the corresponding amplifier 1102. The output of the amplifier 1102 is coupled to the input of the corresponding filter 1104. The output of the filtered 1104 is coupled to the RF input of the corresponding frequency converter 1106. A local oscillator input to the frequency converter 1106 is coupled to an RF local oscillator (LO) 1110. The LO 1110 provides an LO signal to down convert the received RF signal to an IF frequency. The IF output of the frequency converter 1106 is then coupled to the output 1108 of the RF receive chain 1102.

Referring back to FIG. 10, the RX outputs from the switch module 811 are each associated with a corresponding filter 1004. Accordingly, the switch module 811 provides selectable one-to-one coupling of the outputs 1108 of the RF RX chain 1002 to the inputs of a filter 1004 within the IF RX module 805. The output of each filter 1004 is coupled to the input of a corresponding amplifier 1006. As noted above, the particular configuration of amplifiers and filters depends upon the requirements of the particular radio 407. Therefore, the configuration shown in FIG. 10 and FIG. 11 is merely provided as an example of one particular embodiment. Other configurations in which more or less amplifiers and filters placed at the same or other places along the signal path are within the scope of the presently disclosed method and apparatus.

Figure 12:
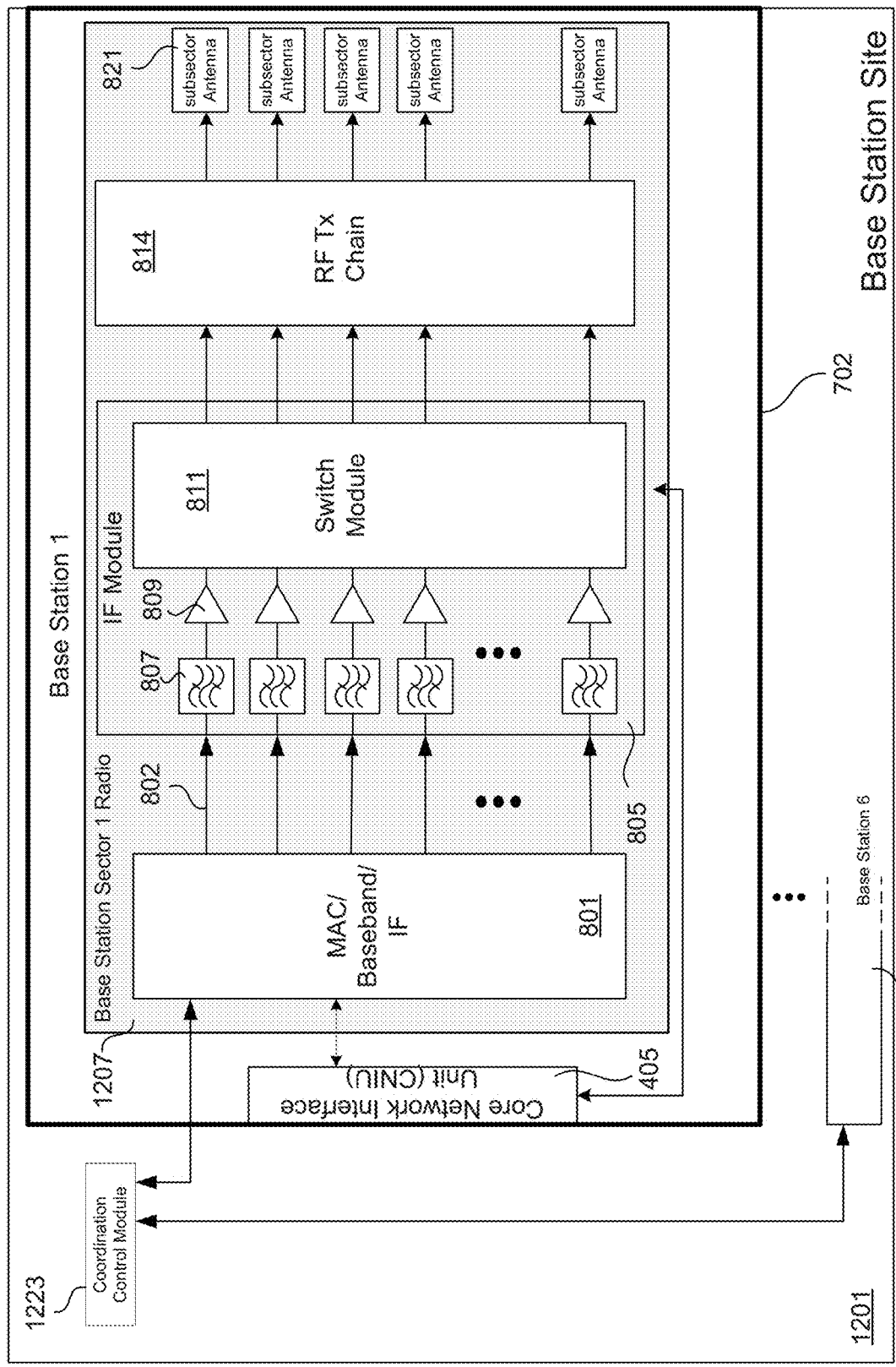
FIG. 12 is a simplified schematic of a base station site illustrating some of the transmit components of the sector radio in accordance with an alternative embodiment such as the base stations show in FIG. 7 in which a coordination control module is shared by all of the base stations.

FIG. 12 is a simplified schematic of a base station site 1201 illustrating some of the transmit components of the sector radio 1207 in accordance with an alternative embodiment in which a coordination control module 1223 is shared by all of the base stations 102. The coordination control module 1223 is responsible for coordinating the operation of the MBI modules 801 and switch modules 811 of each of those base stations 102. In some embodiments, the coordination control module 1223 is coupled to the MBI module 801 and IF module 805. Accordingly, the coordination control module 1223 can coordinate the routing of SSs 803 through the switch module 811 of the IF module 805 with the assignment of the SSs 803 to the outputs of the MBI module 801. In some embodiments, layer 1 702 of the MBI module 801 also adjusts the signals output from the MBI module 801 in response to the CSI measured during a CSI procedure. A control signal line 1224 between the NIU 701 and the MBI module 801 provides a connection through which the coordination control module 1223 can provide control signals to the MBI module 801 to coordinate the operation of the MBI module 801 with the operation of the switch module 811.

Figure 13:
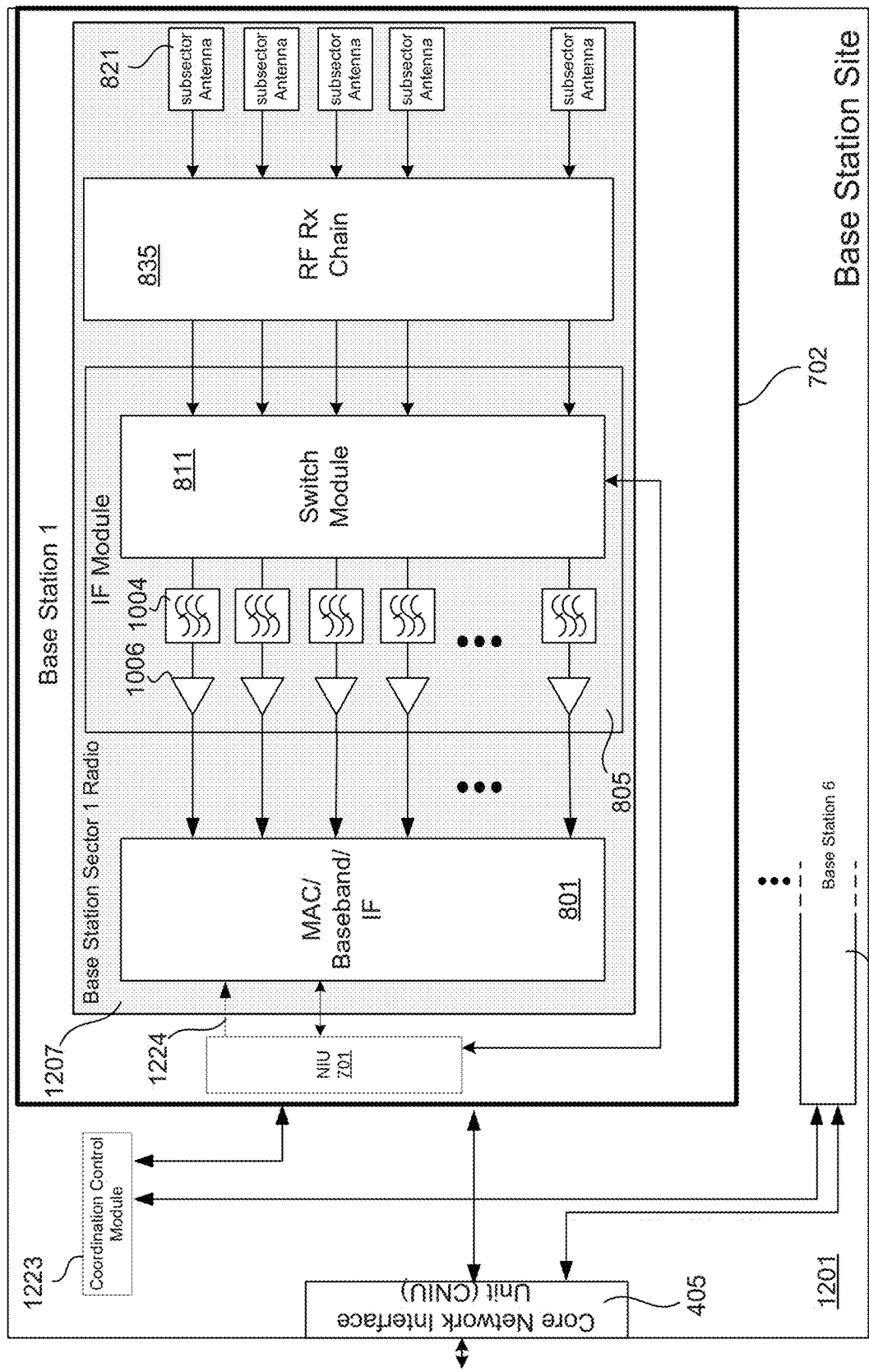
FIG. 13 is a simplified schematic of the base station site 1201 of FIG. 12 illustrating some of the receive components of the sector radio.

FIG. 13 is a simplified schematic of the base station site 1201 of FIG. 12 illustrating some of the receive components of the sector radio 1207. Similar to the case described above with respect to FIG. 12, the coordination control module 1223 provides signals to each base station 102 to coordinate control of the MBI 801 with the switch module 811. The signal flow through the base station radio 1207 is essentially the same as was described above with regard to the base station radio 407 of FIG. 10 with the exception of the coordination control module 1223 providing the control signals that coordinate the operation of the MBI 801 with the operation of the switch module 811.

The subsector antennas 821 within each base station sector radio 407 are a critical component of the base station 102. In accordance with some embodiments of the disclosed method and apparatus, each subsector antenna 821 is designed to focus signals into one of the subsectors 201 in the base station site coverage area 105.

Figure 14:
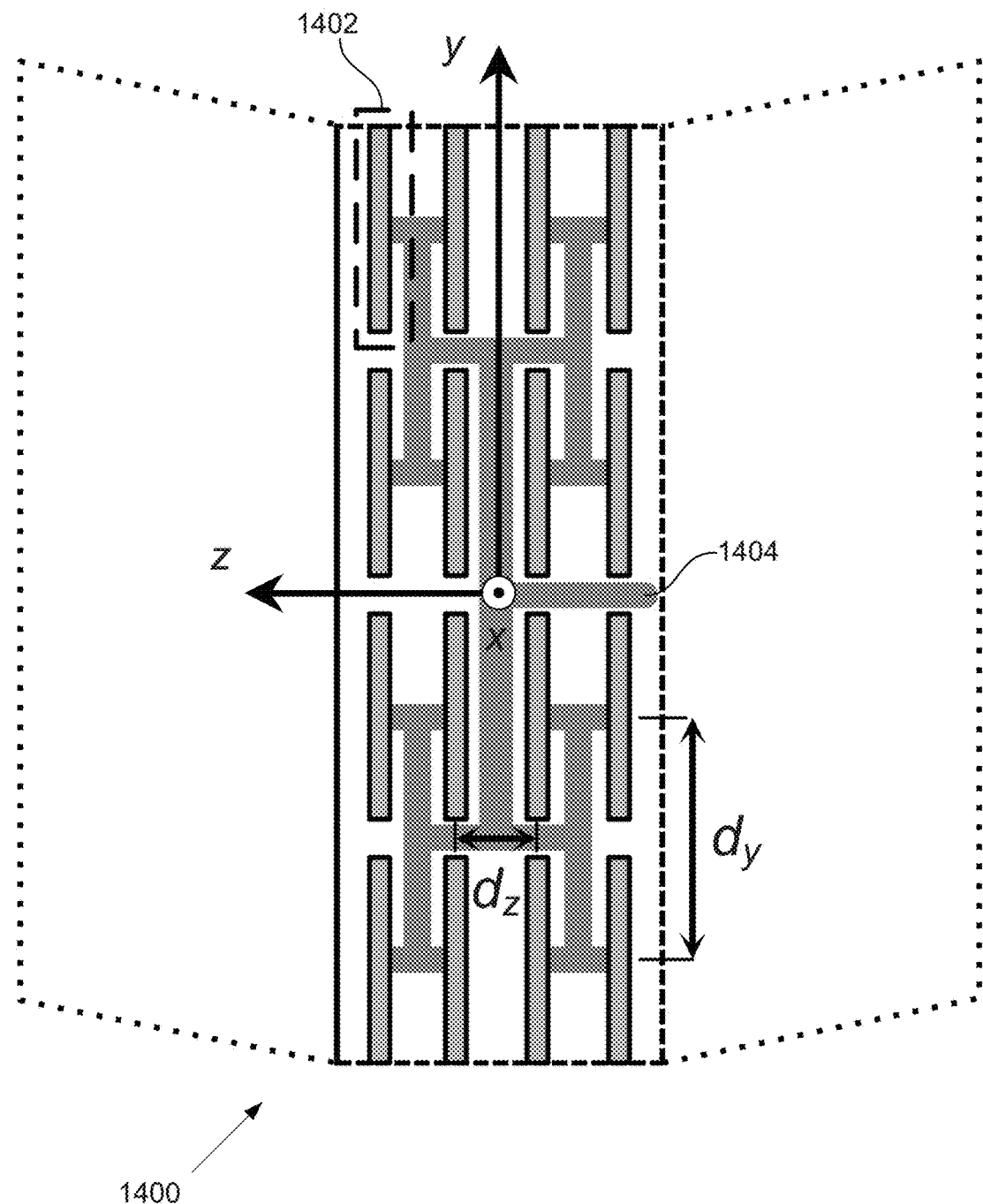
FIG. 14 is an illustration of an example of an Antipodal Linearly Tapered Slot Antenna (ALTSA) array used to transmit and receive signals for one subsector.

FIG. 14 is an illustration of an example of an Antipodal Linearly Tapered Slot Antenna (ALTSA) array 1400 used to transmit and receive signals for one subsector 201. Accordingly, in some embodiments of the disclosed method and apparatus, 8 such ALTSA arrays 1400 are used in each of the subsector antennas 821. Two such subsector antennas are used for each subsector 201. A first transmits signals with a first polarization and a second transmits signals with a second polarization, the first and second polarizations being orthogonal. In the embodiment shown, the ALTSA array 1400 comprises 16 elements 1402 configured in a 4×4 array. All 16 of the elements 1402 are shown coupled to one feed 1404. Such ALTSA antennas are described in an article entitled "Antipodal Linearly Tapered Slot Antenna Array for Millimeter-wave Base Station in Massive MIMO Systems" by Ma, 978-1-4799-3540, published in Antennas and Propagation Society International Symposium (APSURSI), 2014 IEEE.

Figure 15:
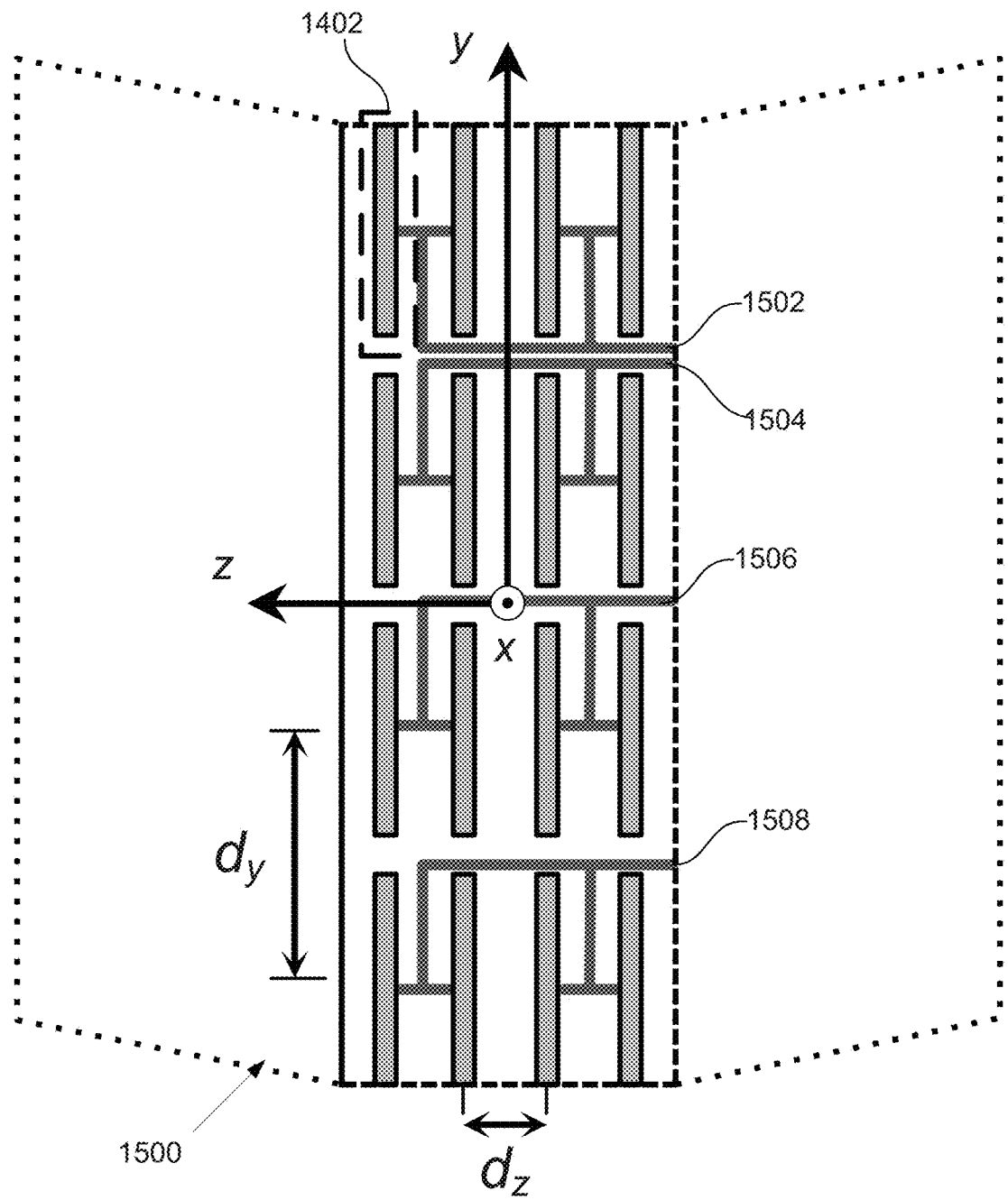
FIG. 15 is an illustration of an alternative embodiment of an ALTSA array in which each set of 4 elements within the same row are coupled to one feed.

FIG. 15 is an illustration of an alternative embodiment of an ALTSA array 1500 in which each set of 4 elements 1402 within the same row are coupled to one feed 1502, 1504, 1506, 1508. Accordingly, the antenna 1500 has four such feeds 1502, 1504, 1506, 1508. By separating the element into four rows, the elevation of the signal transmitted from the array 1500 can be steered. In one embodiment, the signal is steerable by +/−5 degrees as a function of the relative phase of the signals applied to each of the four feeds 1502, 1504, 1506, 1508.

Figure 16:
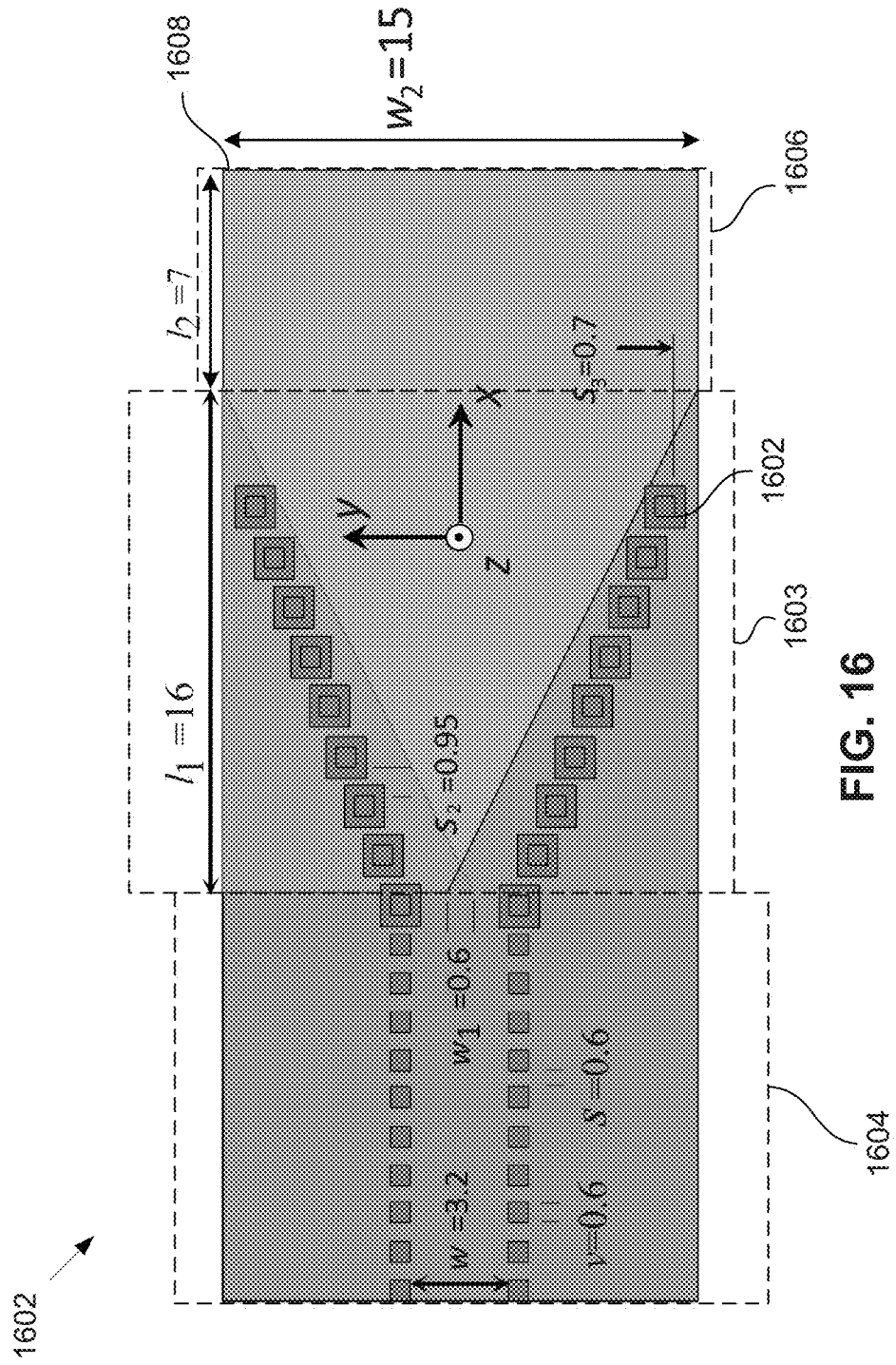
FIG. 16 is an illustration of the structure of one embodiment of a planar high-gain dielectric-loaded ALTSA element of a 16-element ALTSA array, having vias distributed to form a horn shaped section and using a section of substrate integrated waveguide (SIW).

FIG. 16 is an illustration of the structure of one embodiment of a planar high-gain dielectric-loaded ALTSA element

1402 of a 16 element ALTSA array 1400, 1500 having vias 1602 distributed to form a horn shaped section 1603 and using a section 1604 of substrate integrated waveguide (SIW). In the example shown in FIG. 16, a rectangular dielectric load 1606 is used. Design of such structures are discussed in published papers, including N. Ghassemi and K Wu, Planar High-Gain Dielectric-Loaded Antipodal Linearly Tapered Slot Antenna for E- and W-Band Gigabyte Point-to-Point Wireless Services, IEEE Trans. Ant. Propag. vol. 61, no. 4, pp. 1747-1755, April 2013. In accordance with one embodiment of the array 1400, 1500, each element 1402 has a length along the x axis (which in FIG. 14 and FIG. 15 runs out of the page and in FIG. 16 runs from left to right) of 23 mm from the transition of the SIW 1604 to the distal end 1608 of the element 1402. The width of the element 1402 along the y-axis is 15 mm. The y-axis runs from bottom to top in FIG. 14, FIG. 15 and FIG. 16. The dimensions shown apply to an array 1400, 1500 tuned to operate at approximately 35 to 45 GHz. Coupling the signal output from the switch module 811 to an array 1400, 1500 allows the signal to be transmitted through the ALTSA array 1400, 1500 to the particular subsector to which the array 1400, 1500 is directed. For a sector with 4 subsectors 201, 8 such arrays 1400, 1500 receive outputs from 8 outputs of the switch module 811. That is, for each subsector 201 there will be two such arrays 1400, 1500. Each of these two arrays 1400, 1500 is oriented to transmit signals with an orthogonal polarization. For example, a first array 1400, 1500 is oriented to transmit signals with a horizontal polarization and a second array 1400, 1500 is oriented to transmit signals with a vertical polarization.

Figure 17:
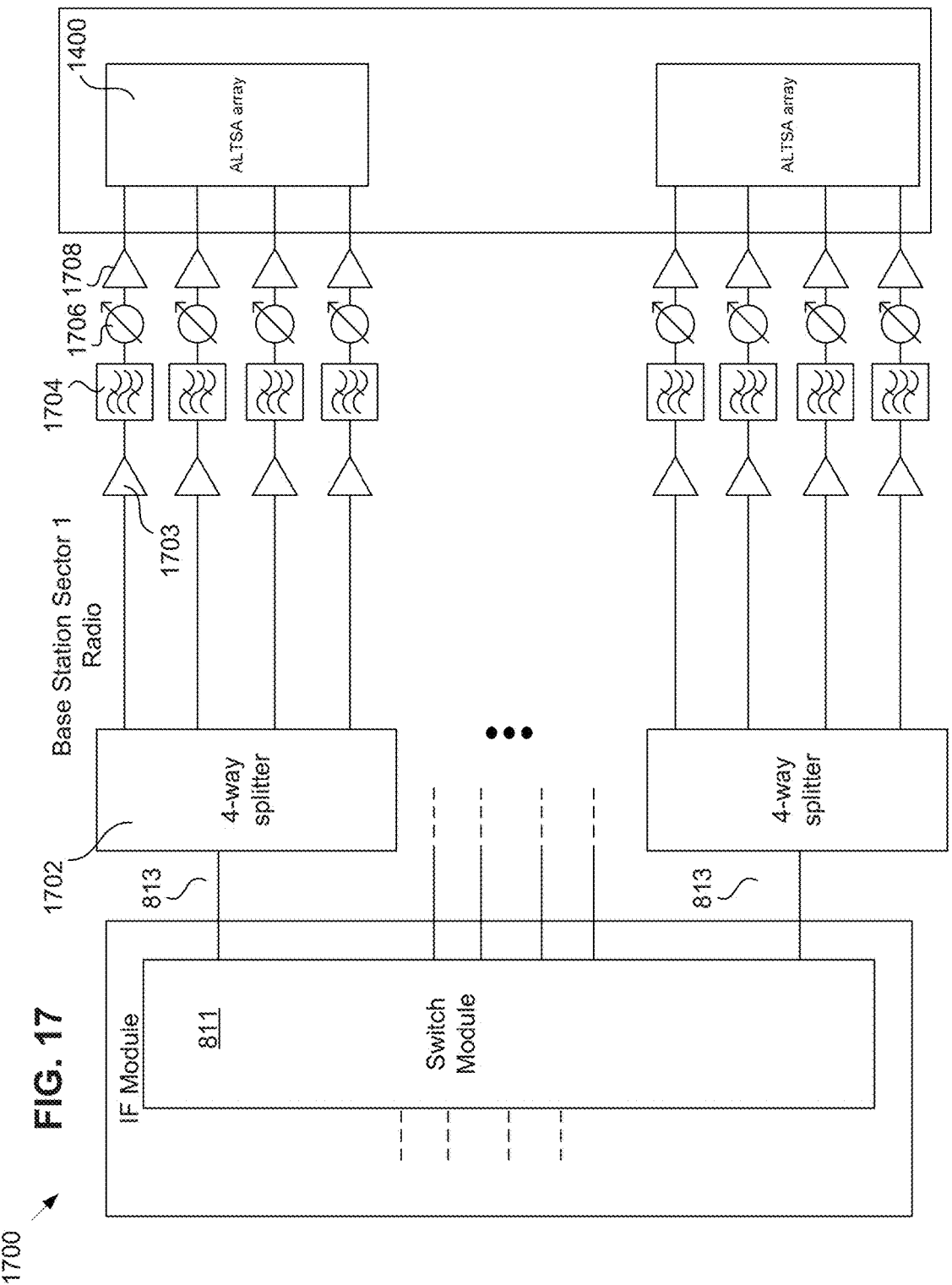
FIG. 17 is an illustration of some of the components of a base station sector radio 1700 using ALTSA arrays 1500 that are steerable in elevation.

FIG. 17 is an illustration of some of the components of a base station sector radio 1700 using ALTSA arrays 1500 that are steerable in elevation. It should be noted that for the sake of simplicity, several components of the radio 1700 that were previously discussed with respect to the radio 407 shown in FIG. 7 and FIG. 12 are not shown in FIG. 17, including the MBI module 801, the Coordination Control module 823 and some components of the IF module 805. However, in some embodiments, such components are nonetheless present in the radio 1700.

Signals output from each output of the switch module 811 are coupled to a 4-way splitter 1502. The 4-way splitter 1502 splits the signal into four outputs. Each output is coupled through a first amplifier 1703, a filter 1704, a phase-shifter 1706 and a second amplifier 1708. As noted above, the particular amplifiers, filters, etc. may vary for different embodiments of the base station sector radio. Accordingly, in some embodiments such as the embodiment shown in FIG. 17, each output of the switch module 811 is amplified, filtered and phase-shifted as appropriate for the set of array elements 1402 (see FIG. 14) to which the signal is coupled. Setting the phase appropriately for each of the four feeds 1404 to the ALTSA array 1500 determines the elevation angle of the beam formed by the ALTSA array 1500. The beam thus formed by each ALTSA array 1500 is transmitted into one of the 4 subsectors 201 of the sector 107. In an embodiment with 4 subsectors 201 in a sector 107, 8 outputs from the switch module 811 are coupled to eight 4-way splitters 1502, providing signals to eight ALTSA arrays 1500, each having 4×4 array elements 1402. For each subsector 201, there are two such arrays 1500 transmitting signals, the signals from each of the two being transmitted with orthogonal polarizations.

Figure 18:
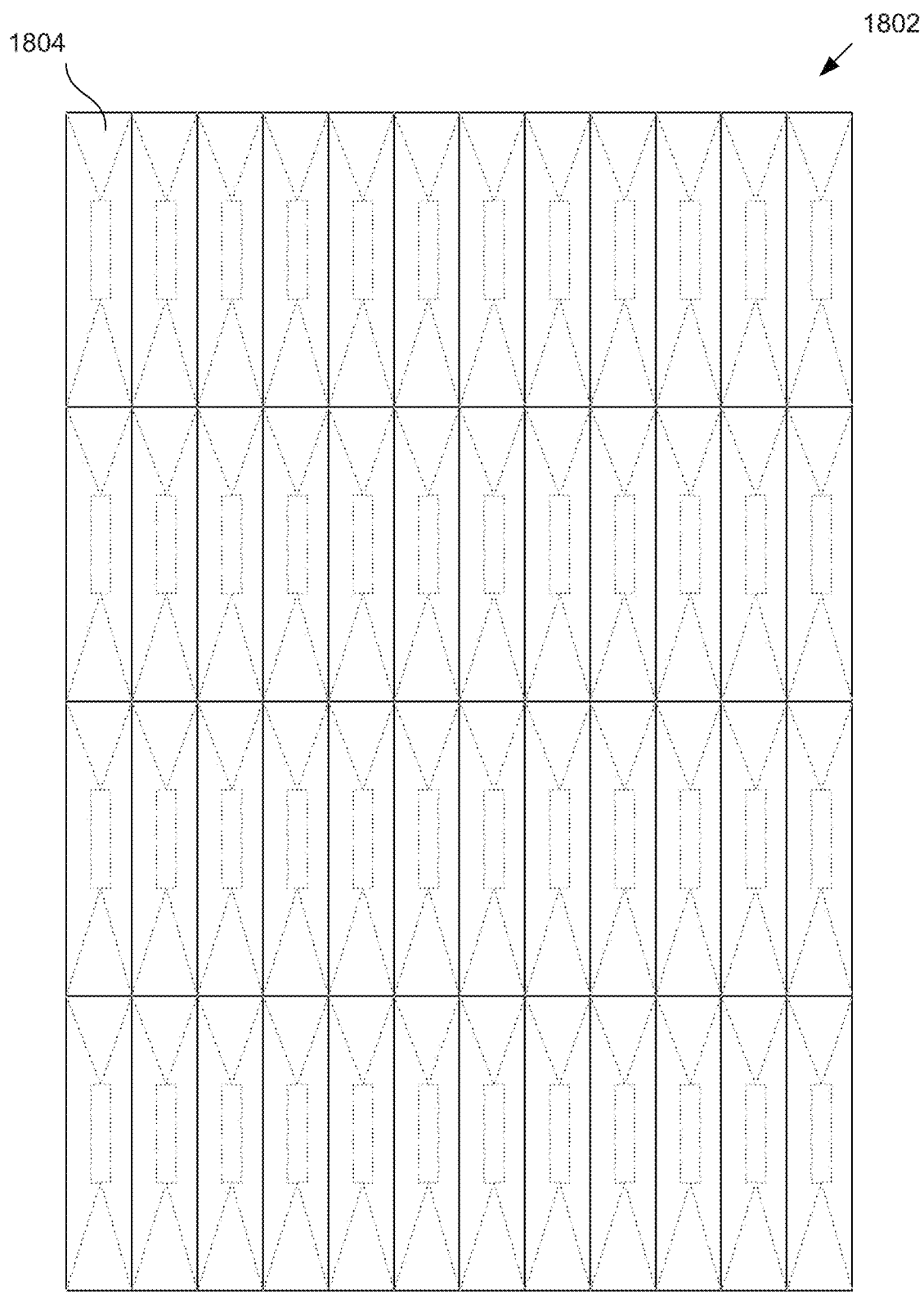
FIG. 18 is an illustration of another antenna design (i.e., a horn array antenna) that can be used in the subsector antenna of the base station sector radio.

FIG. 18 is an illustration of another antenna design (i.e., a horn array antenna) that can be used in the subsector antenna 821 of the base station sector radio 407. One such horn design is presented in an article entitled "Antenna Array Design for Multi-Gbps mmWave Mobile Broadband Communication" published in the Global Telecommunications Conference (GlobeCom 2011) 6133699. A 12×4 array 1802 of horn antennas 1804 are used to create a beam that can be steered into one of the six subsectors 201 within the sector 107 corresponding to the base station 102 in which the radio 407 resides. The beam is relatively narrow. In some embodiments, the beam is approximately 10 degrees in azimuth. Therefore, the beam can be directed into one of six subsectors 201.

Figure 19:
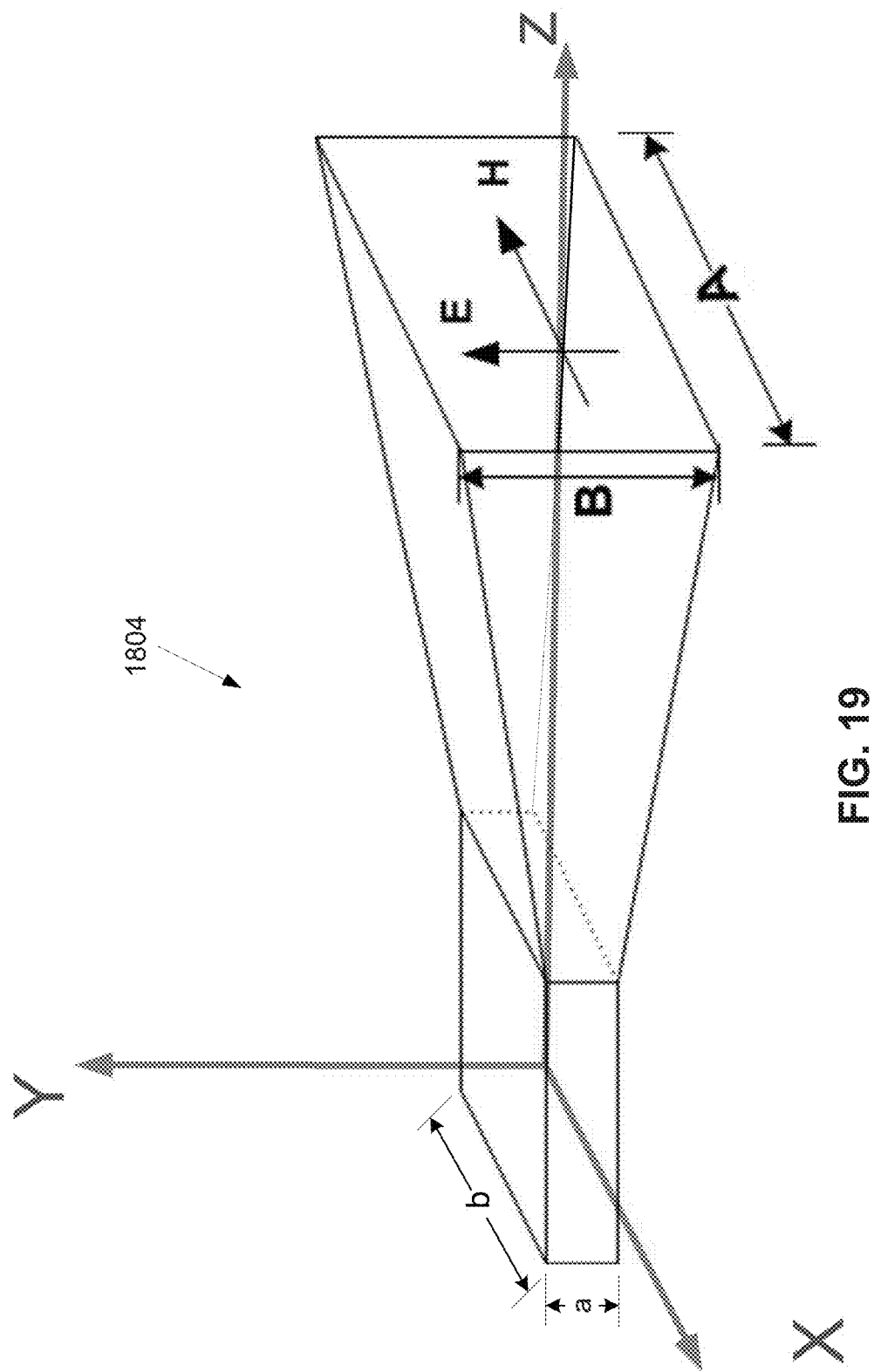
FIG. 19 is an illustration of one of the horns 1804 used in the array.

FIG. 19 is an illustration of one of the horns 1804 used in the array 1802. The dimensions A, B, a and b are dependent upon the operating frequency of the horn 1804. A and B are the horn sides along the H-plane (X-axis) and E-plane (Y-axis), respectively. The H-plane half-power beam-width (HPBW) is $\theta a=150°$, and the E-plane HPBW is $\theta b=20°$ to provide beam-steering in azimuth (Y-axis) to $>\pm30°$ to cover the entire 60° sector with side lobe leakage less than −15 dBr. This translates into the horn antenna parameters of $A=0.53\lambda$ and $B=2.71\lambda$, wherein $\lambda$ is the wavelength of the center operating frequency.

Figure 20:
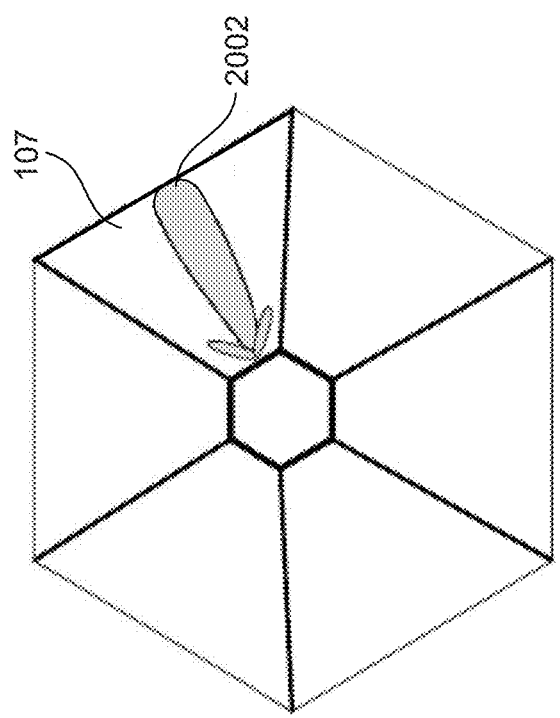
FIG. 20 is an illustration of a beam formed within a sector by a subsector antenna implemented using the array of horn antennas.

FIG. 20 is an illustration of a beam 2002 formed within a sector 107 by a subsector antenna 821 implemented using the array of horn antennas 1802.

Figure 21:
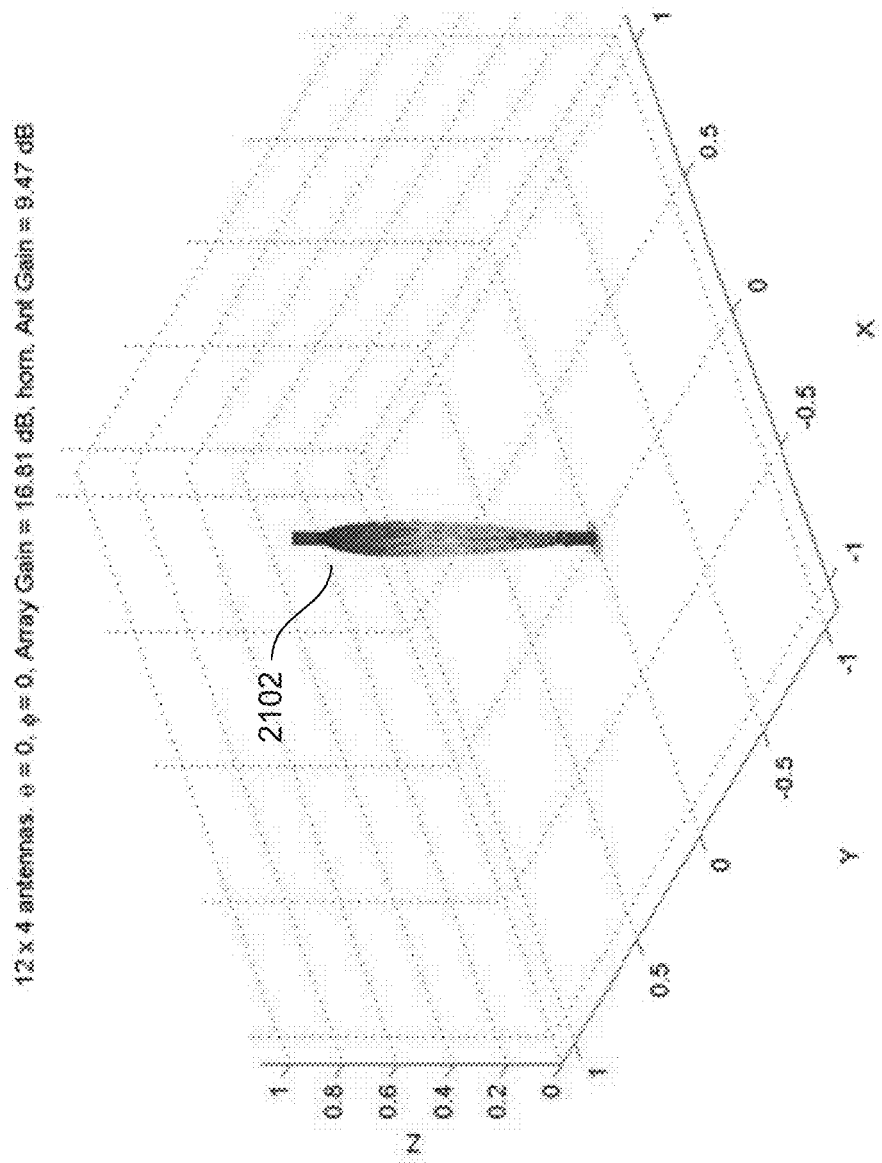
FIG. 21 is a plot of the beam formed by the horn array when the beam is directed along the Z-axis of the array.

FIG. 21 is a plot of the beam 2102 formed by the horn array 1802 when the beam is directed along the Z-axis (i.e., $\theta=0$ degrees and $\phi=0$ degrees) of the array (i.e., parallel to the Z-axis of each of the horns 1804 within the array).

Figure 22:
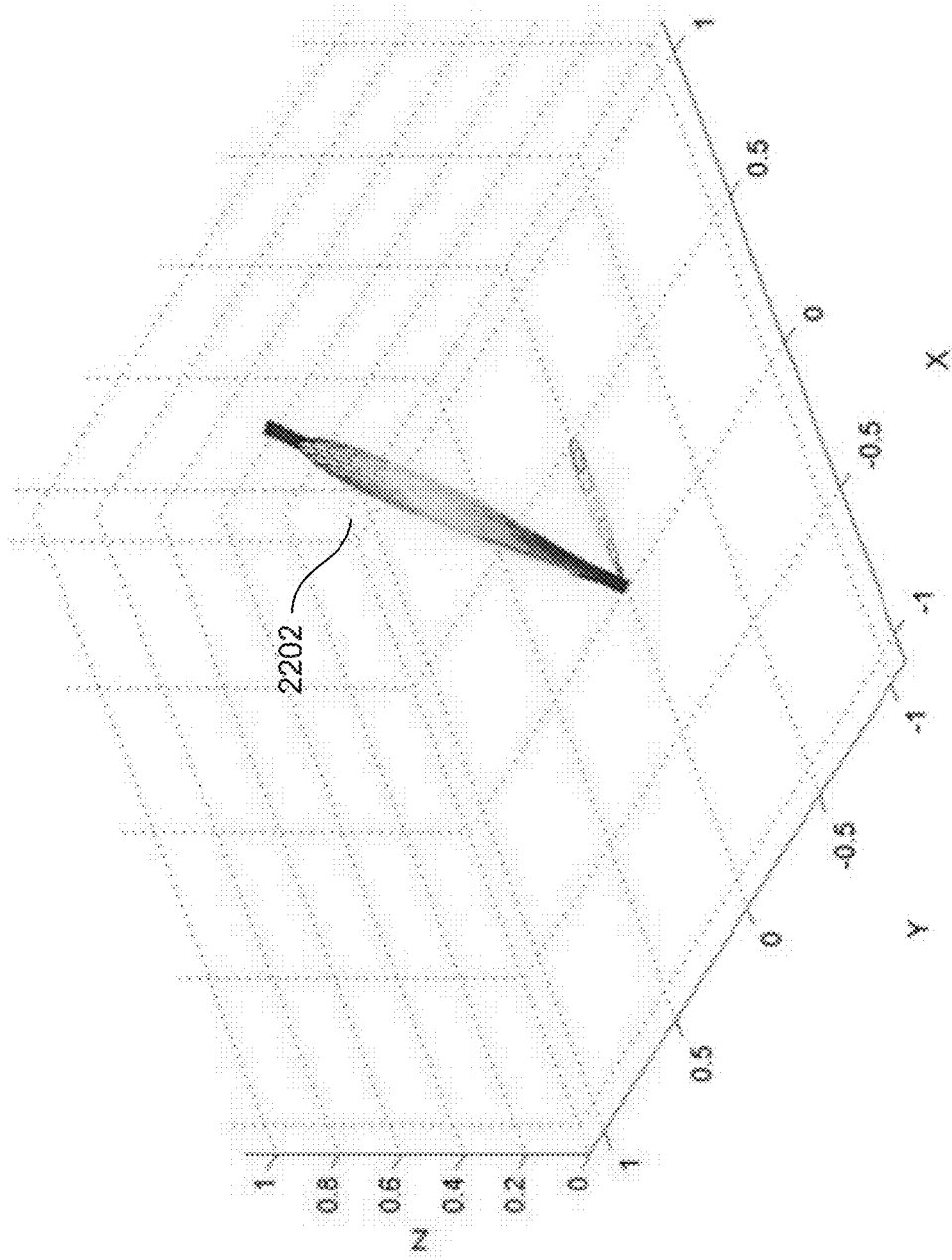
FIG. 22 is a plot of the beam formed by the horn array when the beam is steered to an angle of θ=30 degrees on the E-plane and φ=0 degrees on the H-plane.

FIG. 22 is a plot of the beam 2202 formed by the horn array 1802 when the beam 2202 is steered to an angle of $\theta=30$ degrees on the E-plane and $\phi=0$ degrees on the H-plane.

Figure 23:
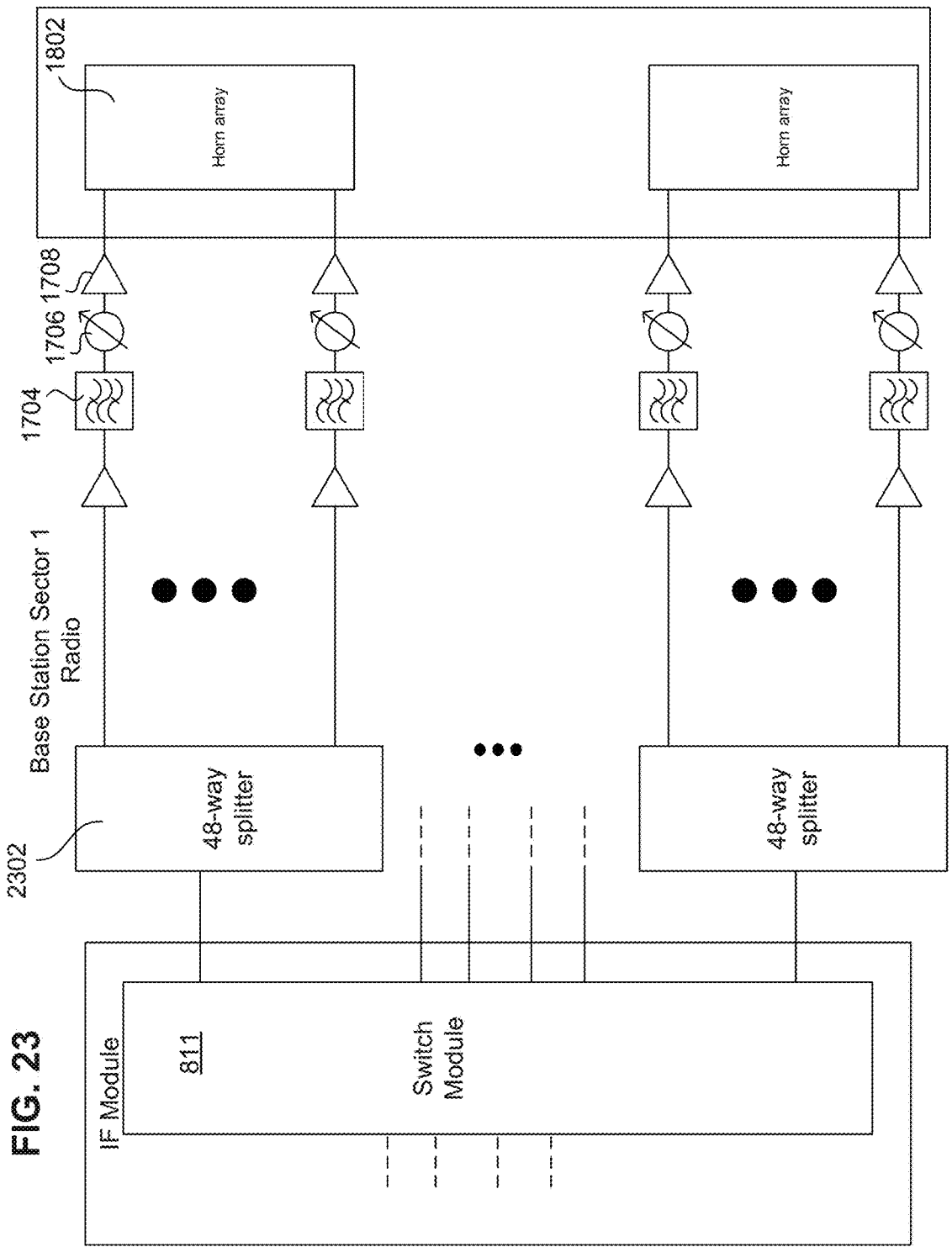
FIG. 23 is a simplified block diagram of a base station sector radio having components similar to the base station sector radio shown in FIG. 7.

FIG. 23 is a simplified block diagram of a base station sector radio 1200 having components similar to the base station sector radio 407 shown in FIG. 7. However, the sector antenna is a horn array antenna 1802. Each of the horns of the array 1802 can be independently beam weighted (i.e., phase and amplitude adjusted) to direct the beam. In some embodiments, a 48-way splitter 2302 is provided to split the output of the switch module 811 to feed each of the 48 independent horns of the array 1802. However, in other embodiments, the feeds of two or more horns can be coupled together to reduce the number of outputs required and the general complexity of the system at the expense of the resolution of the beamformer.

It is to be understood that the foregoing description is intended to illustrate, and not to limit, the scope of the claimed invention. Accordingly, other embodiments are within the scope of the claims. Note that paragraph designations within claims are provided to make it easier to refer to such elements at other points in that or other claims. They do not, in themselves, indicate a particular required order to the elements. Further, such designations may be reused in other claims (including dependent claims) without creating a conflicting sequence.

What is claimed is:

1. A base station associated with a corresponding base station sector, the base station comprising:
   (a) a Media Access Control/Baseband/Intermediate Frequency (MBI) module having at least one input and a plurality of outputs, at least one of the inputs configured to receive content to be transmitted by the base station to at least one subscriber unit located within the corresponding base station sector and at least two of the outputs configured to output a spatial stream containing at least some of the content, each spatial stream being one of a plurality of MIMO spatial streams generated by the MBI module to transmit the content to the at least one subscriber unit;
(b) an Intermediate Frequency (IF) module having a plurality of inputs, each input associated with, and coupled to, a corresponding one of the plurality of outputs from the MBI module, the IF module selectively coupling each of the IF module inputs to a corresponding IF module output; and
(c) a plurality of subsector antennas, each subsector antenna radiating a beam having a unique combination of polarization and associated with a corresponding subsector coverage area, each subsector antenna focused to radiate signals into the corresponding subsector coverage area and each subsector antenna having an input coupled to a corresponding output of the IF module such that each subsector antenna radiates one of the spatial streams to form a MIMO transmission to at least one of the subscriber units;
the base station further comprising at least one splitter, each splitter associated with a corresponding output of the IF module and coupled between the corresponding output of the IF module and at least two corresponding variable phase devices.

2. The base station of claim 1, further comprising at least one amplifier within the IF module associated with a corresponding one of the plurality of MBI module outputs.

3. The base station of claim 1, further comprising a coordination control module coupled to the MBI module and to the IF module to coordinate, generation of the MIMO spatial streams and the assignment of the MIMO spatial streams with the selection of the subsector antenna to which each spatial stream is coupled by the IF module based on channel state information (CSI).

4. The base station of claim 1, wherein each base station transmitting to a base station site coverage area, the base station site coverage area having an azimuth angle of approximately 60 degrees and comprises a plurality of sub sector coverage areas.

5. The base station of claim 4, wherein the subsector coverage areas each have approximately equal azimuth angles.

6. The base station of claim 4, wherein the subsector coverage areas each have an azimuth angle of approximately 10 degrees.

7. The base station of claim 1, wherein each subsector antenna has only one polarization.

8. The base station of claim 1, wherein the MBI module operates in conformance with industry standard IEEE 802.11.

9. The base station of claim 8, wherein the MBI module operates in conformance with industry standard IEEE 802.11 with the exception of controlling the Channel State Information (CSI) process to perform an implicit technique for determining the CSI and wherein the MBI module uses time division duplex (TDD) to transmit signals to subscriber units and receive signals from subscriber units on the same frequency at different times.

10. The base station of claim 1, wherein the spatial streams provided by the MBI module are modulated using orthogonal frequency division multiplexing (OFDM).

11. The base station of claim 10, where the content modulated using orthogonal frequency division multiple access (OFDMA) such that various OFDM subcarriers are directed to different subscriber units.

12. The base station of claim 1, further comprising a coordination control module coupled to the MBI module and to the IF module to coordinate the assignment of the MIMO spatial streams with the selection of the subsector antenna to which each spatial stream is coupled by the IF module.

13. The base station of claim 1, further comprising a core network interface unit (CNIU) coupled to the MBI module to provide access to a core network.

14. The base station of claim 1, wherein the subsector antenna is an Antipodal Linearly Tapered Slot Antenna (ALTSA) array.

15. The base station of claim 1, wherein the subsector antenna is a horn array antenna.

16. A base station associated with a corresponding base station sector, the base station comprising:
(a) a Media Access Control/Baseband/Intermediate Frequency (MBI) module having at least one input and a plurality of outputs, at least one of the inputs configured to receive content to be transmitted by the base station to at least one subscriber unit located within the corresponding base station sector and at least two of the outputs configured to output a spatial stream containing at least some of the content, each spatial stream being one of a plurality of MIMO spatial streams generated by the MBI module to transmit the content to the at least one subscriber unit;
(b) an Intermediate Frequency (IF) module having a plurality of inputs, each input associated with, and coupled to, a corresponding one of the plurality of outputs from the MBI module, the IF module selectively coupling each of the IF module inputs to a corresponding IF module output;
(c) a plurality of subsector antennas, each subsector antenna radiating a beam having a unique combination of polarization and associated with a corresponding subsector coverage area, each subsector antenna focused to radiate signals into the corresponding subsector coverage area and each subsector antenna having an input coupled to a corresponding output of the IF module such that each sub sector antenna radiates one of the spatial streams to form a MIMO transmission to at least one of the subscriber units; and
(d) a coordination control module coupled to the MBI module and to the IF module to coordinate the assignment of the MIMO spatial streams with the selection of the subsector antenna to which each spatial stream is coupled by the IF module;
wherein:
(e) determination of Channel State Information (CSI) is controlled by the MBI module,
(f) the MBI module provides input to the coordination control module to control the time and subsector antenna to which spatial streams output from the MBI module are coupled; and
(g) the coordination control module controls which output of the IF module is coupled to which input of the IF module.

17. The base station of claim 16, wherein the input provided by the coordination control module to the MBI module indicates that the output from the MBI module associated with a channel that is being measured is coupled to an appropriate antenna element.

* * * * *